(12) United States Patent
Aishima et al.

(10) Patent No.: US 12,137,284 B2
(45) Date of Patent: Nov. 5, 2024

(54) THERMOGRAPHIC CAMERA CONTROL METHOD, AND THERMOGRAPHIC CAMERA CONTROL DEVICE

(71) Applicant: Panasonic Intellectual Property Management Co., Ltd., Osaka (JP)

(72) Inventors: Motoka Aishima, Osaka (JP); Yusaku Nakamura, Osaka (JP); Shota Tezuka, Kyoto (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 146 days.

(21) Appl. No.: 17/976,758

(22) Filed: Oct. 29, 2022

(65) Prior Publication Data

US 2023/0051275 A1 Feb. 16, 2023

Related U.S. Application Data

(63) Continuation of application No. PCT/JP2021/020991, filed on Jun. 2, 2021.

(30) Foreign Application Priority Data

Jun. 10, 2020 (JP) .................................. 2020-101084

(51) Int. Cl.
*H04N 23/63* (2023.01)
*G01J 5/00* (2022.01)
(Continued)

(52) U.S. Cl.
CPC .......... *H04N 23/634* (2023.01); *G01J 5/0804* (2022.01); *G01J 5/0859* (2013.01);
(Continued)

(58) Field of Classification Search
CPC .. H04N 23/634; H04N 23/631; H04N 23/667; H04N 5/33; H04N 25/671;
(Continued)

(56) References Cited

U.S. PATENT DOCUMENTS

2004/0075742 A1 4/2004 Mekata et al.
2005/0133709 A1 6/2005 Mekata et al.
(Continued)

FOREIGN PATENT DOCUMENTS

CN 112050948 A * 12/2020 ................ G01J 5/10
JP H04-200526 A 7/1992
(Continued)

OTHER PUBLICATIONS

English translation CN-112050948-A (Year: 2024).*
(Continued)

*Primary Examiner* — Fernando Alcon
(74) *Attorney, Agent, or Firm* — Renner, Otto, Boisselle & Sklar, LLP

(57) ABSTRACT

A thermographic camera control method includes periodically correcting a display temperature of a temperature distribution image at a first interval; and acquiring the temperature distribution image by periodically imaging a temperature measurement target by the thermographic camera at a second interval. The acquiring the temperature distribution image includes imaging the temperature measurement target after elapse of a standby time. The standby time is shorter than the second interval and starts from the correcting the display temperature.

17 Claims, 20 Drawing Sheets

(51) Int. Cl.
*G01J 5/08* (2022.01)
*G01J 5/0804* (2022.01)
*G01J 5/48* (2022.01)
*H04N 23/667* (2023.01)

(52) U.S. Cl.
CPC .............. *G01J 5/48* (2013.01); *H04N 23/631* (2023.01); *G01J 2005/0077* (2013.01); *H04N 23/667* (2023.01)

(58) Field of Classification Search
CPC .... H04N 25/673; G01J 5/0804; G01J 5/0859; G01J 5/48; G01J 2005/0077; G01J 5/80
See application file for complete search history.

(56) References Cited

U.S. PATENT DOCUMENTS

| | | |
|---|---|---|
| 2008/0210872 A1 | 9/2008 | Grimberg |
| 2011/0298931 A1 | 12/2011 | Weisbach |
| 2017/0060049 A1* | 3/2017 | Hasegawa ............ G03G 21/206 |
| 2019/0162656 A1 | 5/2019 | Kitazawa et al. |
| 2022/0132052 A1* | 4/2022 | Mojaver .............. A61B 5/0077 |
| 2023/0128886 A1* | 4/2023 | Yun ........................ H04N 23/60 348/164 |
| 2024/0142312 A1* | 5/2024 | Dangler .................... G01J 5/48 |
| 2024/0159594 A1* | 5/2024 | Krempel ................. G01J 5/061 |

FOREIGN PATENT DOCUMENTS

| | | |
|---|---|---|
| JP | H04-131734 U | 12/1992 |
| JP | 2005-096752 A | 4/2005 |
| JP | 2019-095374 A | 6/2019 |

OTHER PUBLICATIONS

International Search Report for corresponding Application No. PCT/JP2021/020991, mailed Aug. 24, 2021.

The EPC Office Action dated Aug. 24, 2023 for the related European Patent Application No. 21822701.5.

* cited by examiner ered object
THERMOGRAPHIC CAMERA CONTROL METHOD, AND THERMOGRAPHIC CAMERA CONTROL DEVICE

TECHNICAL FIELD

The present disclosure relates to a thermographic camera control method and a thermographic camera control device.

BACKGROUND ART

In a camera such as a thermographic camera for visualizing infrared rays emitted from an object, a display temperature of an acquired temperature distribution image may deviate over passage of time. Therefore, a method for correcting the display temperature is known.

For example, Patent Literature 1 discloses an infrared image capturing device mounted on a moving body. The infrared image capturing device described in Patent Literature 1 controls a timing of determining a correction coefficient based on at least one of a speed of the moving body, a signal of a traffic light in a traveling direction of the moving body, and presence or absence of a detected object in the traveling direction of the moving body.

CITATION LIST

Patent Literature

PTL 1: Unexamined Japanese Patent Publication No. 2005-96752

SUMMARY OF THE INVENTION

The infrared image capturing device described in Patent Literature 1 still has room for improvement in terms of improvement of reliability of imaging of a temperature distribution image.

In view of this, the present disclosure provides a thermographic camera control method and a thermographic camera control device capable of improving reliability of imaging of a temperature distribution image.

A thermographic camera control method according to one aspect of the present disclosure includes:
  periodically correcting a display temperature of a temperature distribution image at a first interval; and
  acquiring the temperature distribution image by periodically imaging a temperature measurement target by the thermographic camera at a second interval.

The acquiring the temperature distribution image includes imaging the temperature measurement target after elapse of a standby time. The standby time is shorter than the second interval and starts from the correcting the display temperature.

A thermographic camera control device according to one aspect of the present disclosure is a thermographic camera control device for controlling a thermographic camera including an imaging element that acquires a temperature distribution image by imaging a temperature measurement target, the thermographic camera control device including:
  a correction controller that periodically corrects a display temperature of the temperature distribution image at a first interval; and
  an imaging controller that causes the imaging element to image the temperature measurement target at a second interval.

The imaging controller causes the imaging element to image the temperature measurement target after elapse of a standby time. The standby time is shorter than the second interval and starts from the correction of the display temperature by the correction controller.

A thermographic camera control method according to one aspect of the present disclosure includes:
  acquiring input information from a user;
  periodically correcting a display temperature of a temperature distribution image at a first interval;
  acquiring the temperature distribution image by imaging a temperature measurement target by the thermographic camera based on the input information; and
  outputting information related to correction of the display temperature.

A thermographic camera control device according to one aspect of the present disclosure is a thermographic camera control device for controlling a thermographic camera including an imaging element that acquires a temperature distribution image by imaging a temperature measurement target, the thermographic camera control device including:
  a correction controller that periodically corrects a display temperature of the temperature distribution image at a first interval;
  an imaging controller that acquires input information input to an input unit and causes the imaging element to image the temperature measurement target based on the input information; and
  an output controller that outputs information related to correction of the display temperature.

According to the present disclosure, a thermographic camera control method and a thermographic camera control device capable of improving reliability of imaging of a temperature distribution image can be provided.

Figure 1:
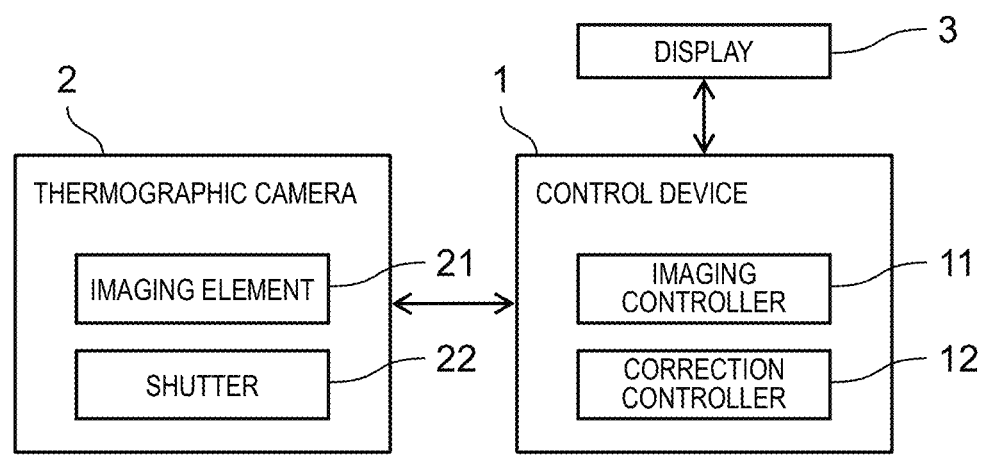
FIG. 1 is a block diagram schematically illustrating a thermographic camera control device according to a first exemplary embodiment of the present disclosure.

DESCRIPTION OF EMBODIMENT (Underlying Knowledge Forming Basis of Present Disclosure)

In a thermographic camera, a display temperature of an acquired temperature distribution image (thermogram) deviates with passage of time. The thermographic camera can acquire a highly accurate temperature distribution image by periodically correcting the display temperature.

However, an abrupt change in display temperature occurs during execution of the temperature correction and immediately after the temperature correction. Therefore, there is a problem that in a case where imaging is performed during or immediately after execution of the temperature correction, a correct temperature distribution image cannot be obtained.

For example, in an interval imaging mode in which imaging is periodically performed by a thermographic camera, if imaging is performed at predetermined time intervals and display temperature correction is performed at predetermined time intervals, an imaging timing and a display temperature correction timing may overlap each other. In this case, there is a problem that imaging is performed at a timing when an abrupt temperature change occurs during execution of correction or immediately after correction, and reliability of a temperature distribution image is lowered.

Furthermore, also in a manual imaging mode in which imaging is performed at a timing set by a user, display temperature correction is performed at predetermined time intervals. In the manual imaging mode, since the imaging timing is determined by the user, the imaging timing and a display temperature correction timing may overlap each other. Also in this case, there is a problem that imaging is performed at a timing when an abrupt temperature change occurs immediately after correction, and reliability of a temperature distribution image is lowered.

In view of the circumstances, the inventors of the present invention have studied obtaining a correct temperature distribution image by controlling an imaging timing in the interval imaging mode. Furthermore, the inventors of the present invention have studied notifying a user that temperature correction is being performed in the manual imaging mode, and have arrived at the following invention.

A thermographic camera control method includes:
periodically correcting a display temperature of a temperature distribution image at a predetermined interval; and
acquiring the temperature distribution image by periodically imaging a temperature measurement target at a predetermined imaging time interval,
wherein the acquiring the temperature distribution image includes imaging the temperature measurement target after elapse of a predetermined standby time shorter than the predetermined imaging time interval from start of the correction.

According to this configuration, it is possible to perform imaging with improved reliability of a temperature distribution image.

The predetermined standby time may be decided based on a display temperature of a temperature distribution image before correction of the display temperature.

According to this configuration, an appropriate standby time can be set.

The thermographic camera may include an imaging element and a shutter disposed closer to the temperature measurement target than the imaging element, and
the correcting the display temperature may be executed by closing the shutter and imaging the shutter.

According to this configuration, the display temperature can be corrected for each pixel by correction.

The control method may further include displaying information indicating that correction is being executed on a display that displays the acquired temperature distribution image in a case where correction is being executed.

According to this configuration, it is possible to notify the user that correction is being executed.

The control method may further include changing the predetermined standby time based on the display temperature of the temperature distribution image.

According to this configuration, by changing the standby time based on the display temperature of the temperature distribution image, it is possible to acquire a more accurate temperature distribution image by changing a correction timing, for example, in a case where there is a rapid change in the temperature.

The changing the predetermined standby time may include shortening the predetermined standby time in a case where a change of the display temperature of the temperature distribution image exceeds a predetermined range.

According to this configuration, a more accurate temperature distribution image can be acquired by changing the standby time in accordance with a rapid change of the display temperature of the temperature distribution image.

The control method may further include changing the predetermined imaging time interval based on the display temperature of the temperature distribution image.

According to this configuration, in a case where the display temperature of the temperature distribution image rapidly changes, a frequency of imaging can be changed according to the change in temperature.

The changing the predetermined imaging time interval may include shortening the predetermined imaging time interval in a case where the display temperature of the temperature distribution image exceeds a predetermined threshold value.

According to this configuration, in a case where the display temperature of the temperature distribution image rapidly changes, for example, due to occurrence of an abnormality, a frequency of imaging can be increased.

The control method may further include issuing warning information in a case where the display temperature of the temperature distribution image exceeds a predetermined threshold value.

According to this configuration, in a case where the display temperature of the temperature distribution image exceeds the threshold value, for example, due to occurrence of an abnormality, the user can be notified by an alarm or the like.

The predetermined standby time may be from 10 seconds to 300 seconds inclusive.

According to this configuration, the correction standby time can be set within a range not affecting the imaging time interval.

A thermographic camera control device according to one aspect of the present disclosure is a thermographic camera control device for controlling a thermographic camera including an imaging element that acquires a temperature distribution image by imaging a temperature measurement target, and includes:
  a correction controller that periodically corrects a display temperature of the temperature distribution image at a predetermined interval; and
  an imaging controller that causes the imaging element to image the temperature measurement target at a predetermined imaging time interval,
  wherein the imaging controller causes the imaging element to image the temperature measurement target after elapse of a predetermined standby time shorter than the predetermined imaging time interval after start of the correction by the correction controller.

According to this configuration, it is possible to perform imaging with improved reliability of a temperature distribution image.

A thermographic camera control method according to one aspect of the present disclosure is a method for controlling a thermographic camera and includes:
  acquiring input information from a user;
  periodically correcting a display temperature of a temperature distribution image at a predetermined correction time interval;
  acquiring the temperature distribution image by imaging a temperature measurement target based on the input information; and
  outputting information related to correction of the display temperature.

According to this configuration, it is possible to perform imaging with improved reliability of a temperature distribution image.

The outputting the information may include displaying first information indicating that correction is being executed on a display that displays the temperature distribution image in a case where correction is being executed.

According to this configuration, a user can be notified that correction is being performed, and imaging during execution of correction can be avoided.

The first information may include an indicator indicating how much longer it takes for the correction to end.

According to this configuration, it is possible to visually recognize how much longer it takes for the correction to end.

The outputting the information may include, in a case where a temperature distribution image is acquired by imaging during execution of correction, adding second information indicating that the acquired temperature distribution image is an image taken during execution of correction to the acquired temperature distribution image.

According to this configuration, it is possible to recognize that the acquired temperature distribution image is an image taken during execution of correction, and therefore it is possible to easily identify whether a change in temperature is a change caused by correction or a change caused by an abnormality.

The outputting the information may include outputting information related to execution of imaging in a case where the input information is received during execution of correction; and
  the acquiring the temperature distribution image may include controlling execution of imaging based on imaging execution information input in response to the information related to execution of imaging.

According to this configuration, in a case where input information giving an instruction to perform imaging is acquired during execution of correction, it is possible to perform control such as stopping or continuing the acquisition of the temperature distribution image.

The outputting the information may include outputting third information indicating that correction is not being executed in a case where correction is not being executed.

According to this configuration, since the user is notified that the correction is not being executed, the user can easily recognize a timing suitable for imaging.

The control method may further include changing the predetermined correction time interval based on the display temperature of the temperature distribution image.

According to this configuration, an appropriate correction time interval can be set based on the display temperature of the temperature distribution image.

The changing the predetermined correction time interval may include shortening the predetermined correction time interval in a case where the display temperature of the temperature distribution image exceeds a predetermined threshold value.

According to this configuration, in a case where the display temperature of the temperature distribution image exceeds the threshold value, for example, due to occurrence of an abnormality, the correction time interval can be shortened to acquire a more correct temperature distribution image.

A thermographic camera control device according to one aspect of the present disclosure is a thermographic camera control device for controlling a thermographic camera including an imaging element that acquires a temperature distribution image by imaging a temperature measurement target, the thermographic camera control device including:
  a correction controller that periodically corrects a display temperature of the temperature distribution image at a predetermined correction time interval;
  an imaging controller that acquires input information input to an input unit and causes the imaging element to image the temperature measurement target based on the input information; and
  an output controller that outputs information related to correction of the display temperature.

According to this configuration, it is possible to perform imaging with improved reliability of a temperature distribution image.

Exemplary embodiments will be described below with reference to the drawings.

First Exemplary Embodiment

[Overall Configuration]

Figure 2A:
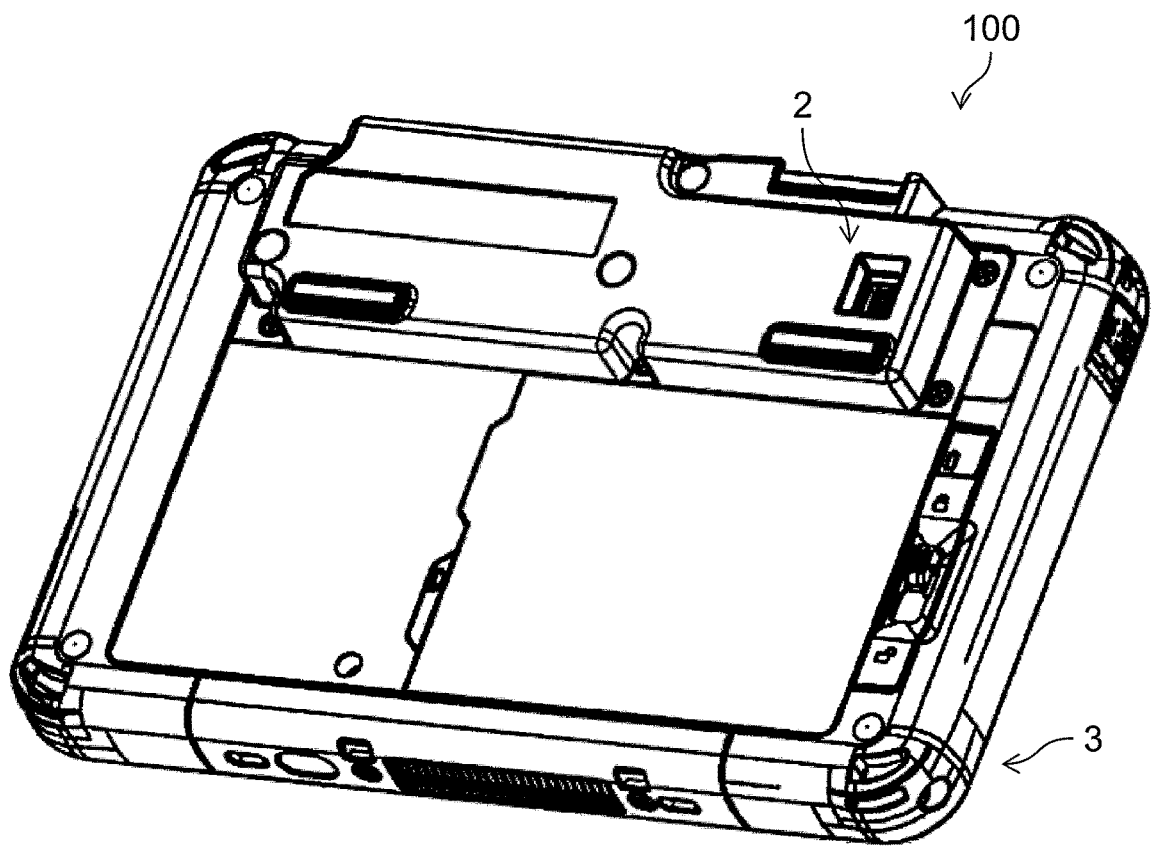
FIG. 2A is a view illustrating a tablet including the control device of FIG. 1.
Figure 2B:
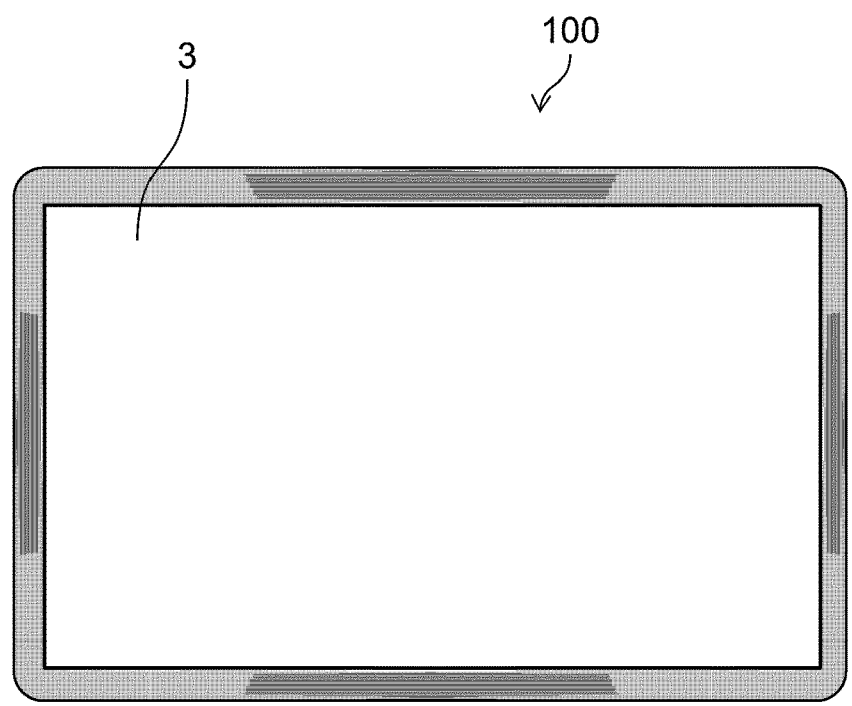
FIG. 2B is a view illustrating a display of the tablet of FIG. 2A.
Figure 3:
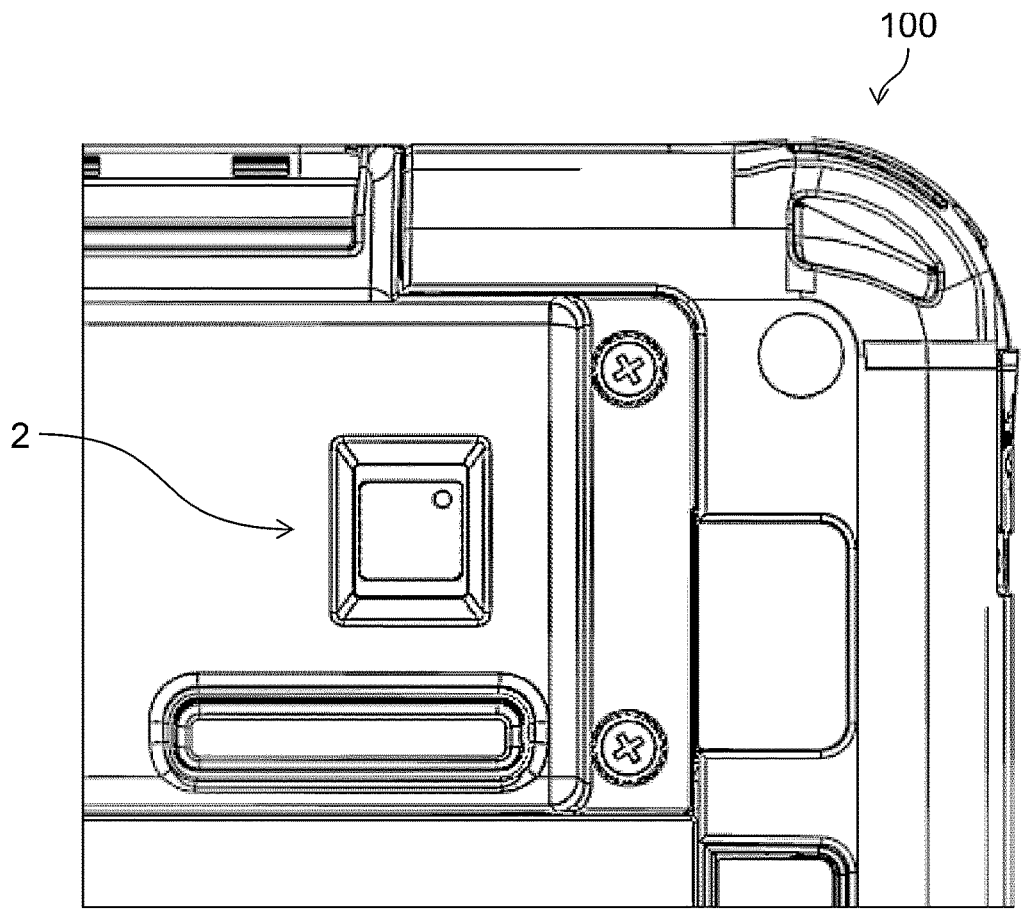
FIG. 3 is an enlarged view of a thermographic camera disposed in the tablet of FIG. 2.

FIG. 1 is a block diagram schematically illustrating control device 1 of thermographic camera 2 according to a first exemplary embodiment of the present disclosure. FIG. 2A is a view illustrating an outer appearance of tablet 100 including control device 1 of FIG. 1. FIG. 2B is a view illustrating display 3 of tablet 100 of FIG. 2A. FIG. 3 is an enlarged view of thermographic camera 2 disposed in tablet 100 of FIG. 2A.

As illustrated in FIG. 1, control device 1 is a device that controls thermographic camera 2. Control device 1 includes imaging controller 11 and correction controller 12. Thermographic camera 2 includes imaging element 21 and shutter 22. In the present exemplary embodiment, control device 1 and thermographic camera 2 are mounted on tablet 100 illustrated in FIGS. 2A and 2B. Furthermore, control device 1 causes display 3 of tablet 100 illustrated in FIG. 2B to display an imaged temperature distribution image.

<Control Device>

Control device 1 controls imaging of a temperature measurement target by thermographic camera 2 and correction of a display temperature. In the present exemplary embodiment, control device 1 controls an interval imaging mode in which imaging is performed periodically at predetermined intervals by thermographic camera 2. The display temperature is a display temperature in a temperature distribution image acquired by imaging a temperature measurement target by thermographic camera 2. Control device 1 periodically corrects the display temperature.

Control device 1 includes imaging controller 11 and correction controller 12.

Imaging controller 11 controls imaging element 21 of thermographic camera 2. Specifically, imaging controller 11 causes imaging element 21 of thermographic camera 2 to image a temperature measurement target (not illustrated) at predetermined imaging time intervals. As a result, a temperature distribution image is acquired. The acquired temperature distribution image is stored in a storage unit (not illustrated) of control device 1. Note that the predetermined imaging time interval is an imaging cycle in the interval imaging mode, and is an example of a second interval. For example, in a case where the imaging time interval is 10 minutes, control device 1 causes thermographic camera 2 to execute imaging every 10 minutes when the interval imaging mode is started. The imaging time interval can be, for example, in a range from 1 minute to 180 minutes inclusive.

Imaging controller 11 causes imaging element 21 to image a temperature measurement target after elapse of a predetermined standby time from start of correction by correction controller 12. The temperature measurement target is an object whose temperature is to be measured by thermographic camera 2. For example, by performing interval imaging of a factory machine or the like as a temperature measurement target, it is possible to monitor a change in display temperature of a temperature distribution image and find an abnormality. The predetermined standby time is shorter than the predetermined imaging time interval. The predetermined standby time is determined by correction controller 12 based on a display temperature of a temperature distribution image before correction of the display temperature of the temperature distribution image.

Correction controller 12 corrects the display temperature of the temperature distribution image. Correction controller 12 periodically corrects the display temperature of the temperature distribution image at predetermined intervals (an example of a first interval).

Control device 1 may be configured with, for example, a CPU, an MPU, a DSP, an FPGA, an ASIC, or the like. A function of control device 1 may be configured only with hardware or may be implemented by a combination of hardware and software. Control device 1 reads data and programs stored in a storage region (not illustrated) in control device 1 and performs various arithmetic processing to implement a predetermined function. Control device 1 may include a CPU or the like mounted on an electronic device such as a PC or a tablet.

<Thermographic Camera>

Thermographic camera 2 acquires a surface temperature of a temperature measurement target and generates a temperature distribution image. For example, thermographic camera 2 is a camera that generates a temperature distribution image by detecting infrared energy radiated from a temperature measurement target and converting a detected amount of infrared energy into a temperature.

Thermographic camera 2 includes imaging element 21 and shutter 22.

Imaging element 21 images a temperature measurement target and acquires a temperature distribution image. For example, imaging element 21 is an imaging element using an infrared sensor. Infrared rays radiated from a temperature measurement target can be detected and imaged by imaging element 21.

Shutter 22 is a mechanical shutter that blocks infrared rays to the imaging element 21 when imaging is not performed. Shutter 22 is disposed closer to the temperature measurement target than imaging element 21. Furthermore, in the present exemplary embodiment, infrared rays to imaging element 21 are also blocked by shutter 22 when temperature correction is executed, as will be described later.

In the present exemplary embodiment, as illustrated in FIGS. 2A and 3, thermographic camera 2 is disposed on a back face of tablet 100 (a face opposite to display 3). By disposing the thermographic camera on the back face of tablet 100, it is possible to perform imaging while checking an image on display 3.

<Display>

Display 3 is, for example, a display panel such as a liquid crystal display, and is mounted on tablet 100 in the present exemplary embodiment. A temperature distribution image taken by thermographic camera 2 can be displayed on display 3.

<Correction of Display Temperature>

Figure 4:
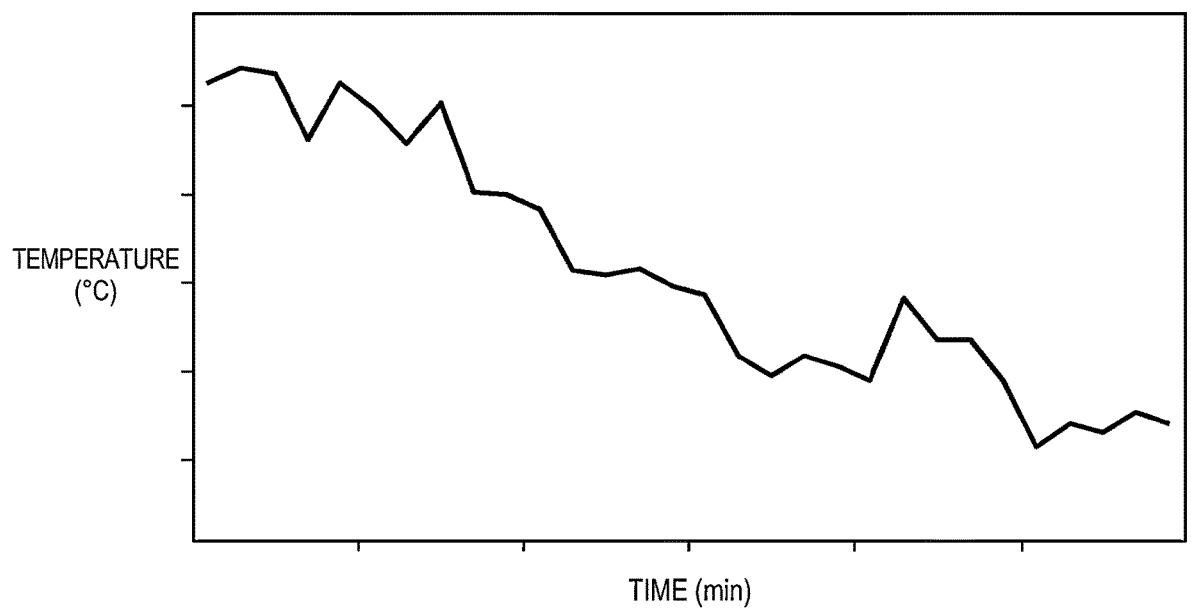
FIG. 4 is a graph illustrating a display temperature of a temperature distribution image by the thermographic camera in a case where correction of the display temperature is not performed.

FIG. 4 is a graph illustrating a display temperature of a temperature distribution image by thermographic camera 2 in a case where correction of the display temperature is not performed. Even in a case where an actual temperature of a temperature measurement target is constant, a detected display temperature of a temperature distribution image gradually decreases unless the display temperature is corrected. This is due to influence of variations in sensitivity among pixels of imaging element 21, a change in environmental temperature, and the like. Note that, depending on thermographic camera 2, the display temperature may gradually increase. Furthermore, a degree of deviation differs from one pixel to another. For example, a deviation of 5° C. may occur in one pixel, and a deviation of 10° C. may occur in another pixel. Therefore, control device 1 periodically corrects the display temperature of the temperature distribution image.

In the present exemplary embodiment, the display temperature is corrected by periodically closing shutter 22 and imaging shutter 22. This is to correct the display temperature by regularly closing shutter 22 and imaging a shutter surface having a uniform temperature. By imaging shutter 22, it is possible to simultaneously correct temperature deviations of the pixels. The correction of the display temperature is periodically executed, for example, at intervals of about 3 minutes to 5 minutes.

Figure 5A:
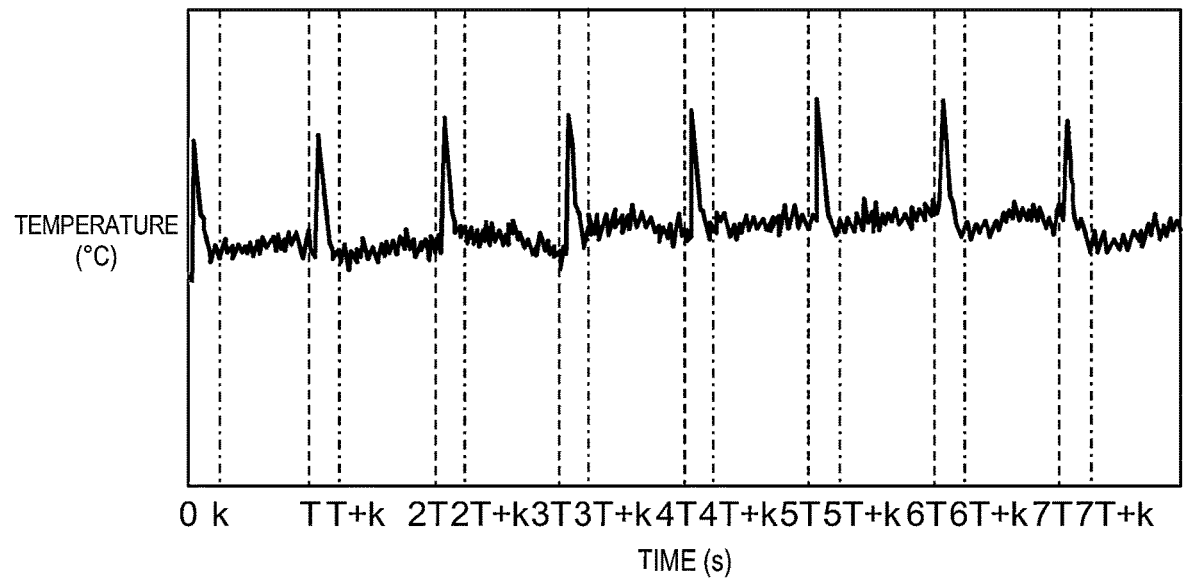
FIG. 5A is a graph illustrating a display temperature of a temperature distribution image by the thermographic camera in a case where correction is regularly performed.
Figure 5B:
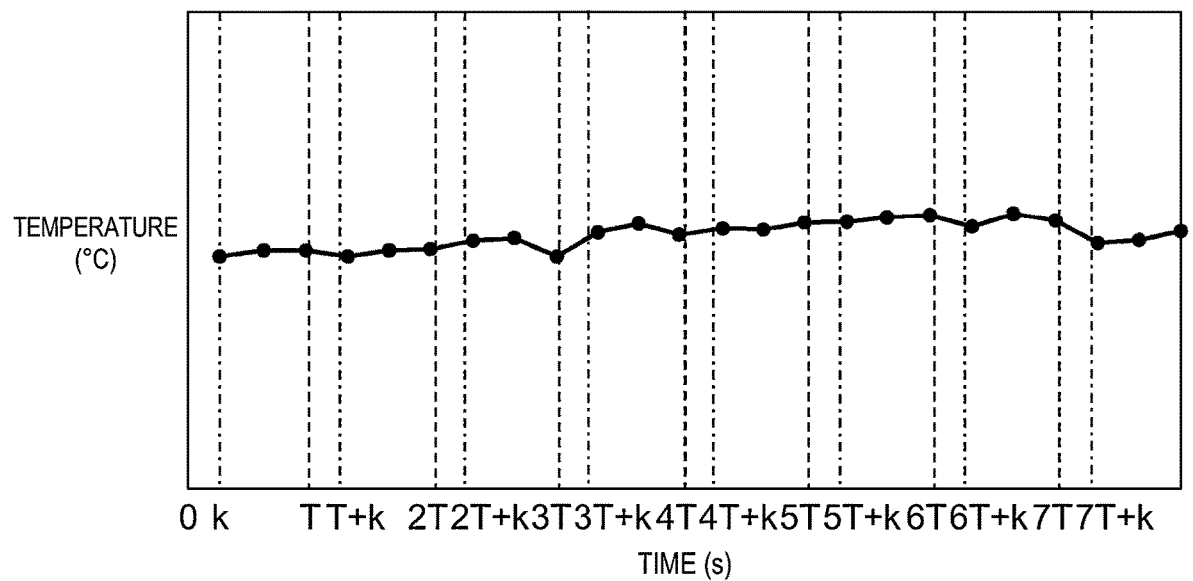
FIG. 5B is a graph illustrating a temperature obtained in a case where the temperature measurement target of FIG. 5A is imaged at a time other than a standby time.

FIG. 5A is a graph illustrating a display temperature of a temperature distribution image by thermographic camera 2 in a case where correction is regularly performed. FIG. 5B is a graph illustrating a display temperature of a temperature distribution image obtained in a case where the temperature measurement target of FIG. 5A is imaged at a time other than the standby time. In FIG. 5A, initial correction is started at a time 0, and then correction is periodically started every T seconds. As illustrated in FIG. 5A, immediately after start of correction, the temperature temporarily rises rapidly. After elapse of a standby time of k seconds from the start of correction, the display temperature of the temperature distribution image is stabilized. Therefore, in the present exemplary embodiment, imaging is performed after elapse of a predetermined standby time of k seconds from the start of correction. As illustrated in FIG. 5B, when imaging is performed after elapse of the standby time of k seconds from the start of correction, a temperature distribution image excluding the rapid change in the display temperature in the graph of FIG. 5A can be acquired.

Figure 6:
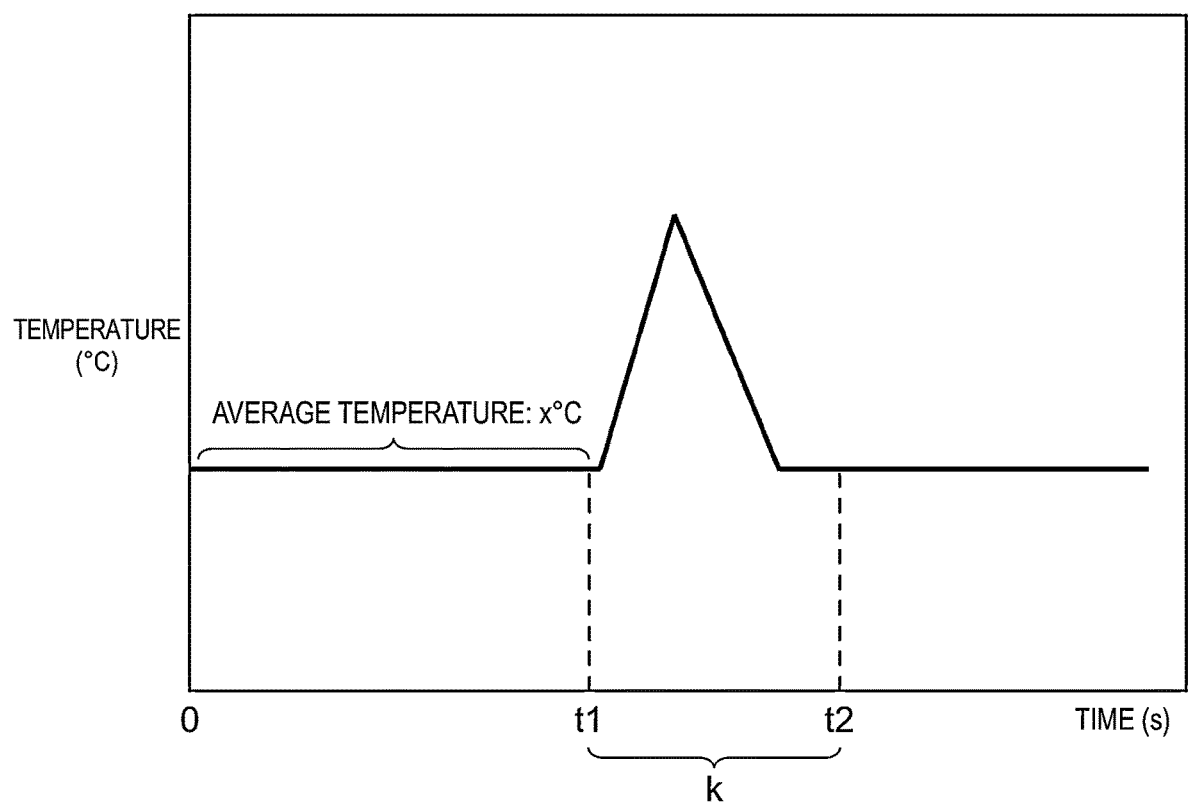
FIG. 6 is a view for explaining a method for deciding the standby time of k seconds.

The predetermined standby time of k seconds is decided in advance for each thermographic camera 2. The standby time of k seconds is decided based on a display temperature of a temperature distribution image before correction of the display temperature. For example, the standby time of k seconds can be decided by imaging a reference object having a constant surface temperature by thermographic camera 2. As the reference object, for example, a blackbody furnace or the like can be used. That is, the reference object may be an object different from the temperature measurement object. FIG. 6 is a graph for explaining a method deciding the standby time of k seconds.

In FIG. 6, an average temperature x° C., which is an average of temperatures obtained in a case where the reference object is imaged from the time 0 at which temperature measurement is started to a time t1 at which correction is started, is acquired by thermographic camera 2. The average temperature x° C. can be acquired, for example, by acquiring a plurality of temperature distribution images before the time t1 at which correction is started and calculating an average value of display temperatures of the respective images. Next, an elapsed time from the time t1 at which correction is performed to a time t2 at which an average temperature obtained by imaging the blackbody furnace falls within a predetermined range from the average temperature x° C. before the correction is measured. The elapsed time from t1 to t2 is the standby time of k seconds. Note that the predetermined range is decided by the average temperature x° C., characteristics of thermographic camera 2, or the like. The above processes are repeated to decide an optimum value of the standby time of k seconds.

[Control Method]

Figure 7:
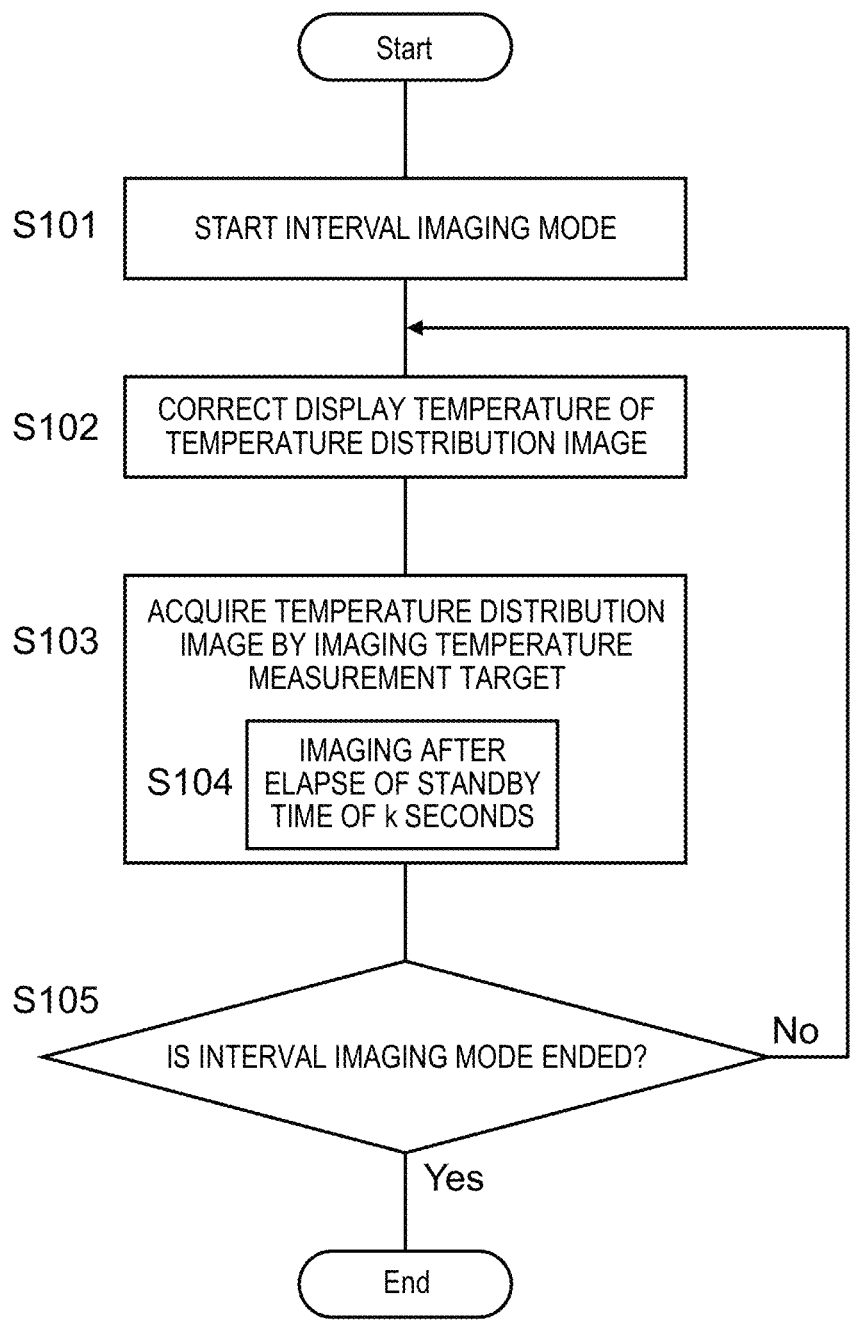
FIG. 7 is a flowchart illustrating a control method of the thermographic camera in the control device.

A method for controlling thermographic camera 2 will be described with reference to FIG. 7. FIG. 7 is a flowchart for explaining a method for controlling thermographic camera 2.

First, imaging controller 11 starts the interval imaging mode (step S101). The interval imaging is started, for example, in response to an input from a user. In the present exemplary embodiment, it is assumed that a predetermined imaging time interval of the interval imaging is N seconds.

When the interval imaging is started, correction controller 12 corrects a display temperature of a temperature distribution image (step S102).

After the display temperature correction is started, imaging controller 11 images a temperature measurement target and acquires a temperature distribution image (step S103). In step S103, the temperature measurement target is imaged after elapse of a predetermined standby time (k seconds) shorter than the predetermined imaging time interval (N seconds) from the start of the correction of the display temperature in step S102 (step S104).

After imaging the temperature measurement target and acquiring the temperature distribution image, imaging controller 11 determines whether or not to end the interval imaging mode (step S105). For example, imaging controller 11 determines that the interval imaging mode is ended in a case where the number of taken images exceeds a predetermined number or in a case where the user inputs an instruction to stop the imaging. In a case where imaging controller 11 determines that the interval imaging mode is not ended (No in step S105), the processing returns to step S102 after elapse of N-k seconds from the imaging in step S103, and correction of the display temperature is started again. In a case where imaging controller 11 determines that the interval imaging mode is ended (Yes in step S105), the processing ends.

As described above, according to the control method, in the interval imaging mode, the display temperature of the temperature distribution image is periodically corrected at predetermined intervals, and the temperature distribution image is acquired by periodically imaging the temperature measurement target at predetermined imaging time intervals (N seconds). Furthermore, acquiring the temperature distribution image includes imaging the temperature measurement target after elapse of the predetermined standby time (k seconds) shorter than the predetermined imaging time interval (N seconds) from the start of the correction.

[Operation]

Figure 8:
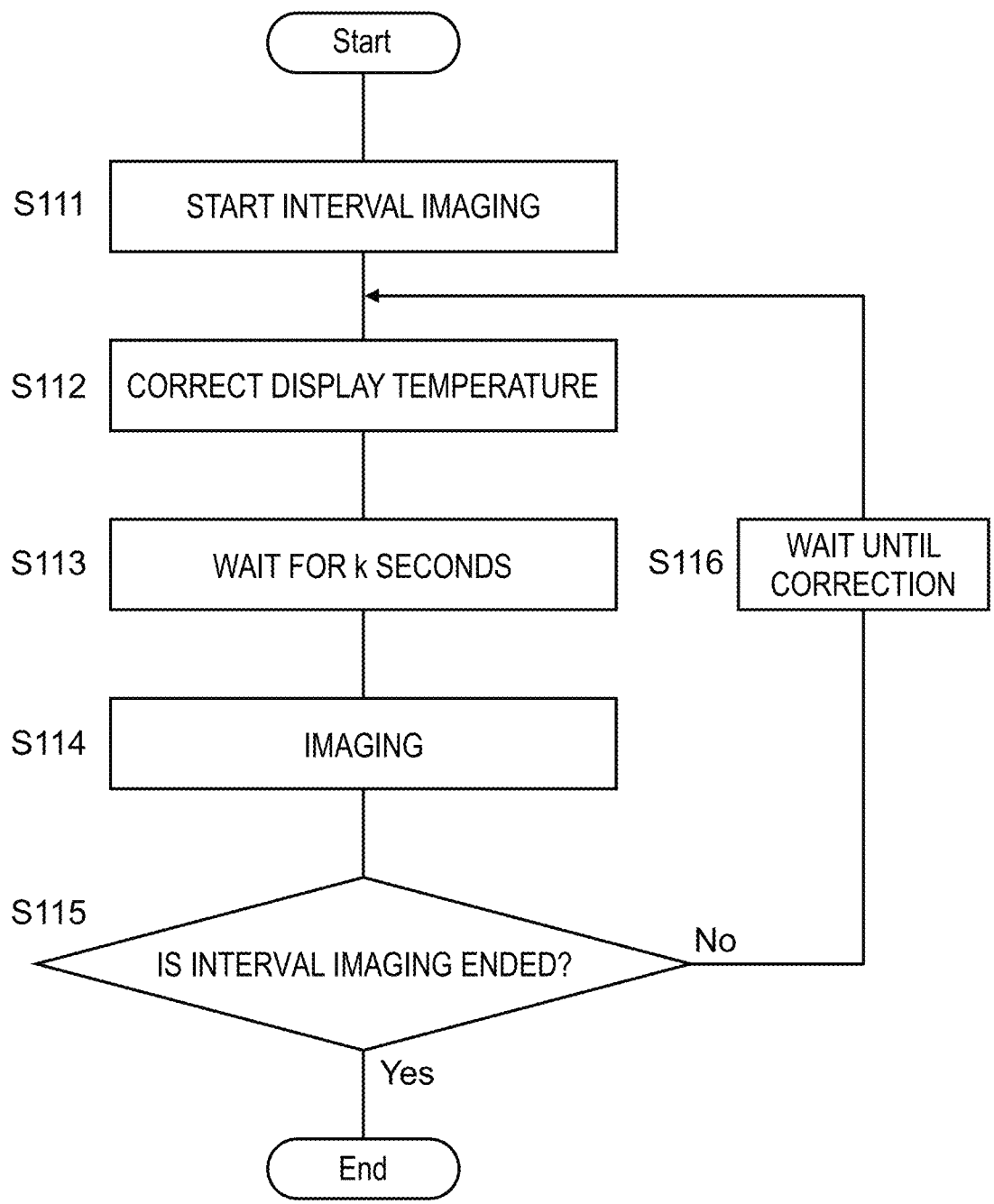
FIG. 8 is a flowchart illustrating control operation of the thermographic camera in the control device.
Figure 9:
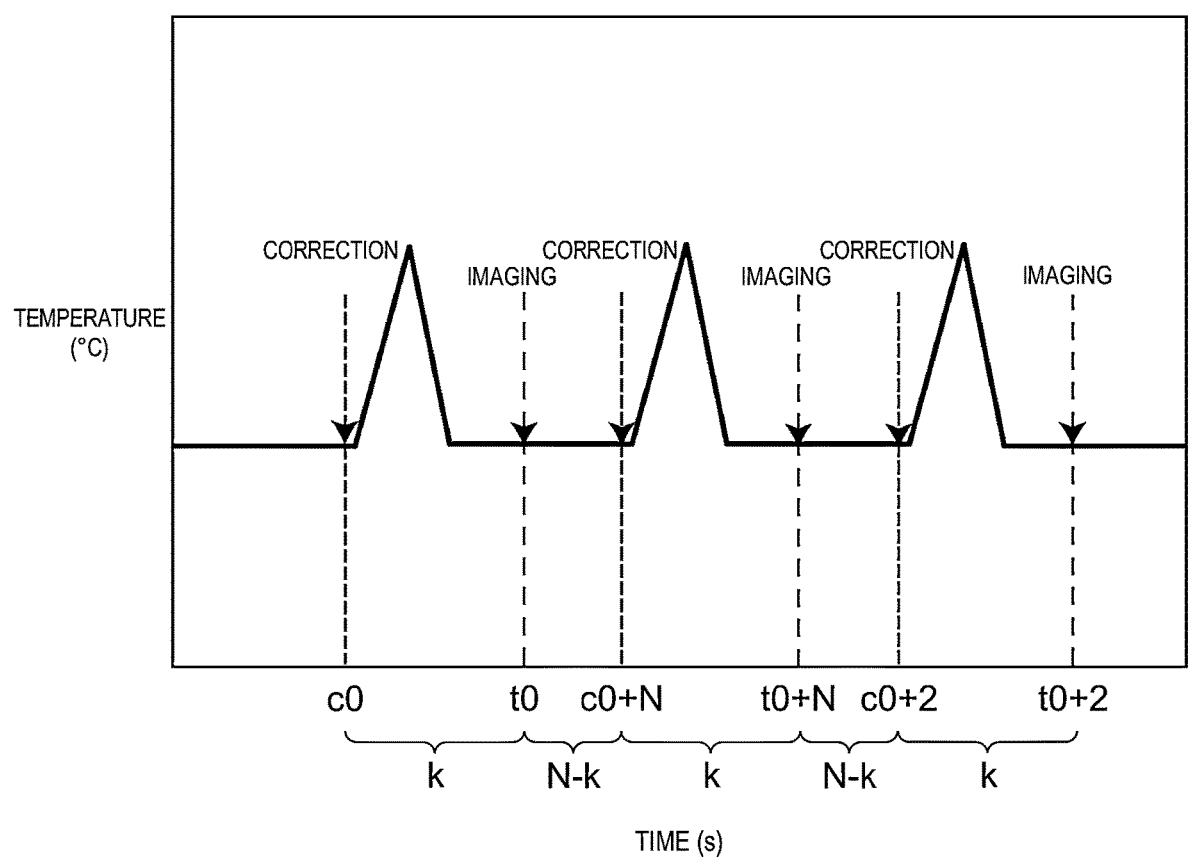
FIG. 9 is a graph illustrating an example of a relationship between correction and imaging in an interval imaging mode.

Control operation of thermographic camera 2 by control device 1 will be described with reference to FIGS. 8 and 9. FIG. 8 is a flowchart illustrating the control operation of thermographic camera 2 in control device 1. FIG. 9 is a graph illustrating an example of a relationship between correction and imaging in the interval imaging mode.

In the present exemplary embodiment, acquisition of the temperature distribution image is performed in a mode called interval imaging that is periodically executed at predetermined imaging time intervals (N second intervals). The predetermined standby time from the start of the correction is k seconds.

The interval imaging mode is started based on information input by the user (step S111). The information input by the user may include an imaging time interval, an imaging period, the number of taken images, or the like. The input information is input via, for example, an input device (not illustrated) such as a touch panel, a keyboard, or a button of tablet 100.

When the interval imaging is started, correction controller 12 starts correction of the display temperature (step S112). In the present exemplary embodiment, as illustrated in FIG. 9, when the interval imaging mode is started, correction is started at a time c0. The display temperature is corrected by closing shutter 22 of thermographic camera 2 and imaging a surface of shutter 22 having a uniform temperature. Variations in temperature among pixels of imaging element 21 are corrected when shutter 22 is closed. That is, after imaging controller 11 closes shutter 22, imaging element 21 acquires a temperature distribution image of shutter 22 by imaging shutter 22. Periodically at predetermined intervals, imaging controller 11 closes shutter 22, and imaging element 21 images shutter 22. The temperature distribution image of shutter 22 is considered to have a relatively uniform temperature distribution unlike the temperature distribution image of the temperature measurement target outside thermographic camera 2. Therefore, correction controller 12 can automatically and appropriately correct variations among the pixels of imaging element 21 by periodically correcting the display temperature of the temperature distribution image of the temperature measurement target based on the temperature distribution image of shutter 22.

Imaging controller 11 waits until the standby time of k seconds elapses from the start of the correction of the display temperature (step S113). When the standby time of k seconds elapses, imaging controller 11 causes imaging element 21 to image the temperature measurement target and acquire a temperature distribution image by controlling thermographic camera 2 (step S114). As illustrated in FIG. 9, imaging is executed at a time t0 that is k seconds after the time c0.

Imaging controller 11 determines whether or not to end the interval imaging (step S115). It is determined that the interval imaging is ended, for example, in a case where input information indicative of end of the imaging input by the user is acquired, in a case where a predetermined number of temperature distribution images have been acquired, or in a case where an imaging end time, which is counted by a timer, has arrived. In a case where imaging controller 11 determines that the interval imaging is not ended (No in step S115), correction controller 12 waits until N-k seconds elapses from the imaging (step S116). After waiting for N-k seconds, correction controller 12 returns to step S112 and starts correction of the display temperature.

In a case where imaging controller 11 determines that the interval imaging is ended (Yes in step S115), the processing ends.

In the example illustrated in FIG. 9, when the interval imaging mode is started, correction of the display temperature is started at the time c0. Thereafter, after elapse of the standby time of k seconds from the start of the correction, the temperature measurement target is imaged at the time to. Furthermore, after the standby time of N-k seconds, the second correction is started. By thus executing imaging after elapse of the predetermined standby time of k seconds from the start of correction, an imaging timing and a correction timing can be shifted from each other. Note that, as illustrated in FIG. 9, in the present exemplary embodiment, the predetermined interval at which the display temperature is corrected is N seconds, which is the same as the predetermined imaging time interval at which the temperature measurement target is imaged.

Effects

According to the above exemplary embodiment, a thermographic camera control method and a thermographic camera control device capable of improving reliability of imaging of a temperature distribution image can be provided.

By executing imaging after elapse of the standby time of k seconds from the start of correction of the display temperature, it is possible to acquire a more accurate temperature distribution image while avoiding a temperature fluctuation caused by the correction.

Although an example in which control device 1 is mounted on tablet 100 has been described in the above exemplary embodiment, the present disclosure is not limited to this. Control device 1 may be mounted on an information processing device other than a tablet. Alternatively, control device 1 may be a controller such as a CPU of thermographic camera 2.

Furthermore, although an example in which thermographic camera 2 includes shutter 22 has been described in the above exemplary embodiment, shutter 22 is not essential. In a case where thermographic camera 2 does not include shutter 22, correction by correction controller 12 is executed, for example, by correcting a temperature fluctuation for each pixel by using a correction table prepared in advance regarding a display temperature of a temperature distribution image and an environmental temperature.

Furthermore, although the standby time of k seconds is decided by imaging a blackbody furnace as the reference object in the above exemplary embodiment, a method of deciding the standby time is not limited to this. The standby time may be decided by a method different from the above method depending on a camera characteristic or a correction method (shutter correction or shutterless correction). Alternatively, the standby time may be automatically decided from a temperature fluctuation at a time of imaging.

Second Exemplary Embodiment

A second exemplary embodiment will be described with reference to FIGS. 10 and 11. In the second exemplary embodiment, the same or equivalent configurations as those in the first exemplary embodiment are denoted by the same reference numerals as those in the first exemplary embodiment. The description already given for the first exemplary embodiment is omitted for the second exemplary embodiment.

Figure 10:
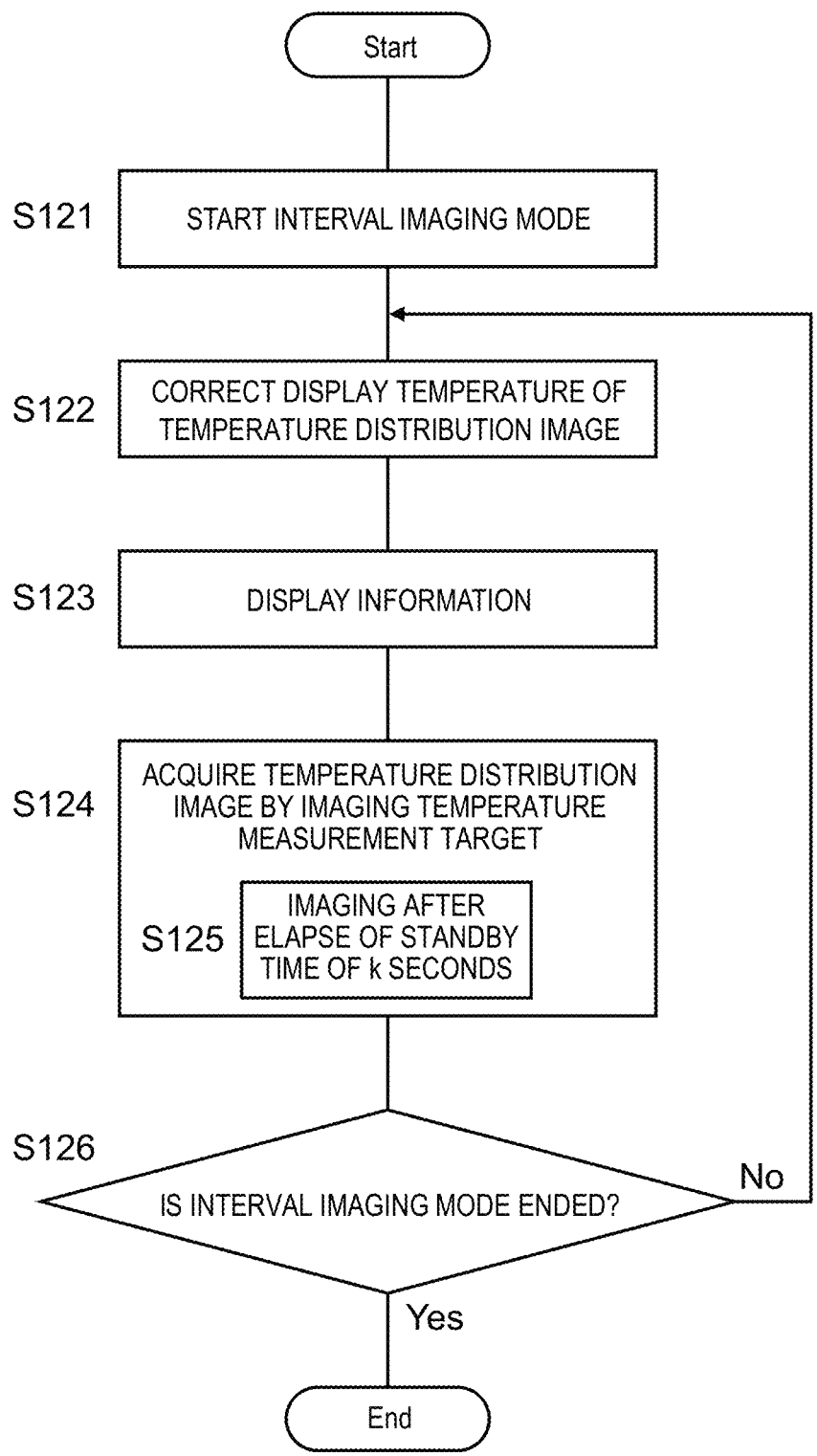
FIG. 10 is a flowchart illustrating a method for controlling a thermographic camera according to a second exemplary embodiment.

FIG. 10 is a flowchart illustrating a method for controlling thermographic camera 2 according to the second exemplary embodiment. FIG. 11 is a diagram illustrating a display example of a temperature distribution image on display 3.

The second exemplary embodiment is different from the first exemplary embodiment in that the second exemplary embodiment includes a step (step S123) in which imaging controller 11 displays information indicating that correction is being executed on display 3 until a predetermined standby time of k seconds elapses from start of correction by correction controller 12. Note that steps S121 to S122 and steps S124 to S126 in FIG. 10 are identical to steps S101 to S102 and steps S103 to S105 in the first exemplary embodiment, and therefore description thereof is omitted.

Figure 11:
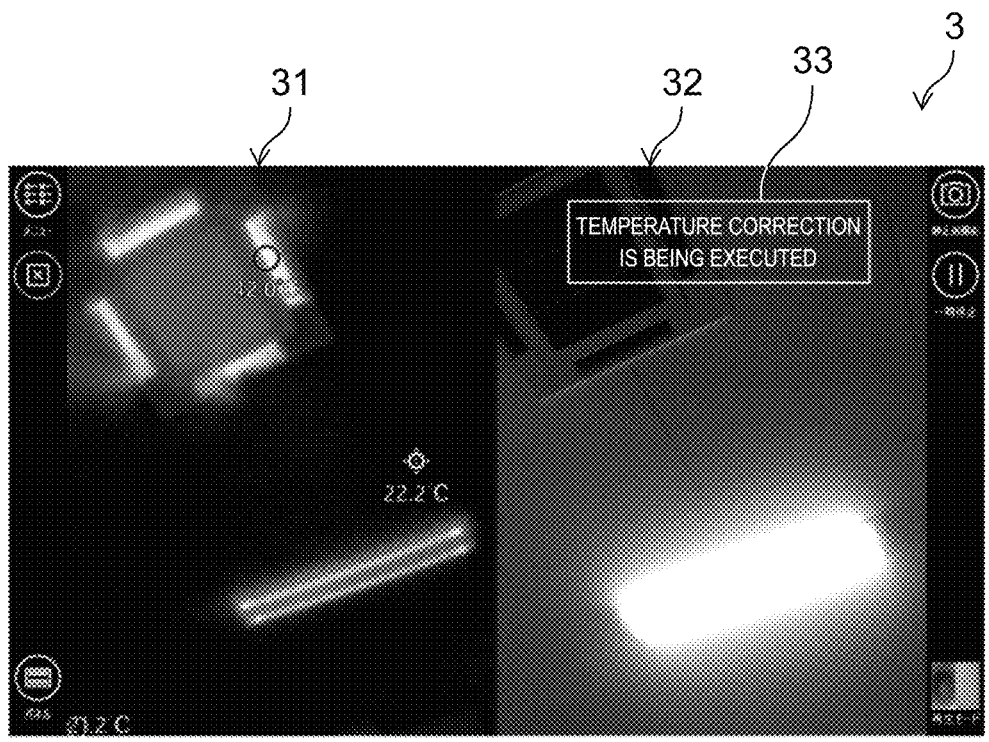
FIG. 11 is a diagram illustrating a display example of a temperature distribution image on a display.

In step S123, in a case where correction is being executed, information 33 indicating that "temperature correction is being executed" is displayed on display 3 as illustrated in FIG. 11. The case where correction is being executed indicates a period from start of correction of a display temperature by correction controller 12 in step S122 to a time after elapse of a standby time of k seconds.

Information 33 may be a character, a symbol, or the like displayed on display 3. Alternatively, information 33 may be given by sound, light, or the like. Note that, on display 3 in FIG. 11, temperature distribution image 31 acquired by thermographic camera 2 is displayed on the left side, and image 32 acquired by a visible light camera (not illustrated) is displayed on the right side. Information 33 may be displayed on image 32 as illustrated in FIG. 10, may be displayed on temperature distribution image 31, or may be displayed on both of images 31 and 32. Only temperature distribution image 31 may be displayed on display 3.

Information 33 is displayed on display 3 until the standby time of k seconds elapses from the start of the correction in step S122.

Effects

According to the above exemplary embodiment, by notifying that correction is being executed until the standby time of k seconds elapses from start of the correction, it is possible to avoid imaging during occurrence of a rapid change in temperature after the start of the correction. Therefore, it is possible to perform imaging with improved reliability of a temperature distribution image.

Note that although an example in which information 33 is displayed on display 3 until the standby time of k seconds elapses from start of correction has been described in the above exemplary embodiment, this is not restrictive. For example, information 33 may be displayed beyond the standby time of k seconds from start of correction.

Third Exemplary Embodiment

A third exemplary embodiment will be described with reference to FIG. 12. In the third exemplary embodiment, the same or equivalent configurations as those in the first exemplary embodiment are denoted by the same reference numerals as those in the first exemplary embodiment. The description already given for the first exemplary embodiment is omitted for the third exemplary embodiment.

Figure 12:
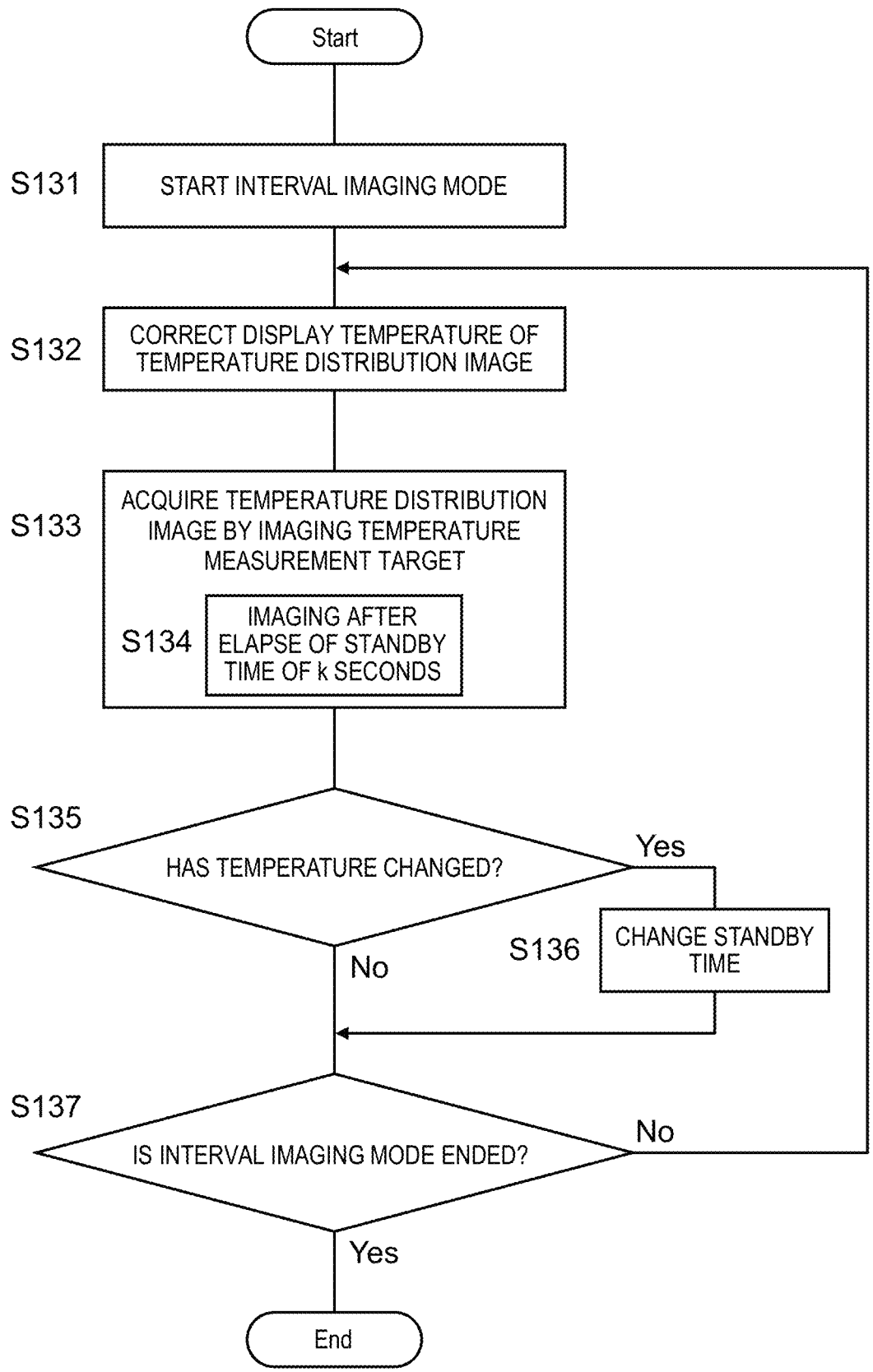
FIG. 12 is a flowchart illustrating a method for controlling a thermographic camera according to a third exemplary embodiment.

FIG. 12 is a flowchart illustrating a method for controlling thermographic camera 2 according to the third exemplary embodiment.

The third exemplary embodiment further includes steps (steps S135 and S136) of changing standby time k based on a display temperature of a temperature distribution image when imaging controller 11 acquires the temperature distribution image by imaging a temperature measurement target. Note that steps S131 to S134 and step S137 are identical to steps S101 to S104 and step S105 of the first exemplary embodiment, and therefore description thereof is omitted.

In step S135, imaging controller 11 determines whether or not a change in display temperature of a temperature distribution image exceeds a predetermined range. For example, an average value of display temperatures of temperature measurement targets appearing in the temperature distribution image is calculated, and in a case where a change of the average value exceeds a predetermined range, it can be determined that the change in display temperature exceeds the predetermined range. Alternatively, in a case where an average value of display temperatures of a temperature measurement target appearing in the temperature distribution image during a certain fixed time exceeds a predetermined range, it can be determined that the change in display temperature exceeds the predetermined range. As the average value during the certain fixed time, for example, an average value of display temperatures of a specific portion of the temperature measurement target during a past one minute can be used. Instead of the average value, a maximum value, a median value, or a minimum value of the display temperatures of the temperature measurement target appearing in the temperature distribution image may be used.

Alternatively, a display temperature of a specific portion of the temperature measurement target appearing in the temperature distribution image may be used. For example, in a case where there is a temperature change of 10° C. or more from previous imaging, imaging controller 11 determines that the temperature change exceeds the predetermined range. In a case where it is determined that the temperature change exceeds the predetermined range (Yes in step S135), imaging controller 11 shortens the standby time of k seconds (step S136).

The standby time of k seconds can be changed within a range from 10 seconds to 300 seconds inclusive.

Effects

According to the above exemplary embodiment, it is possible to perform imaging with improved reliability of a temperature distribution image. Furthermore, since a time it takes for a rapid change in temperature after start of correction to steady down may differ depending on a display temperature of a temperature distribution image, a more accurate temperature distribution image can be acquired by changing the standby time based on a change in display temperature of the temperature distribution image.

Although the standby time of k seconds is changed to a shorter time in the above exemplary embodiment, the standby time of k seconds may be changed to a longer time in a case where the temperature change exceeds a predetermined range.

Fourth Exemplary Embodiment

A fourth exemplary embodiment will be described with reference to FIG. 13. In the fourth exemplary embodiment, the same or equivalent configurations as those in the first exemplary embodiment are denoted by the same reference numerals as those in the first exemplary embodiment. The description already given for the first exemplary embodiment is omitted for the fourth exemplary embodiment.

Figure 13:
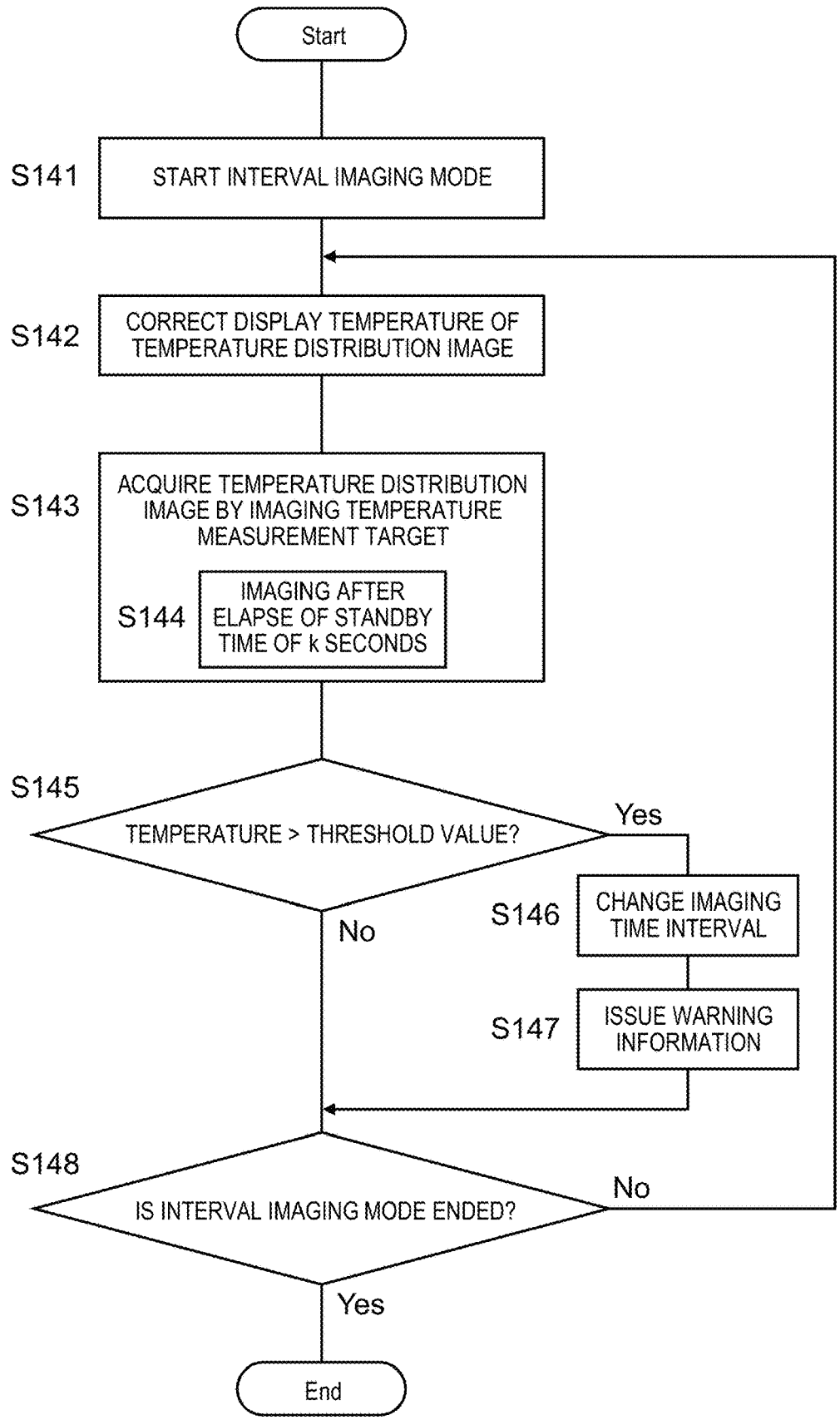
FIG. 13 is a flowchart illustrating a method for controlling a thermographic camera according to a fourth exemplary embodiment.

FIG. 13 is a flowchart illustrating a method for controlling thermographic camera 2 according to the fourth exemplary embodiment.

The fourth exemplary embodiment is different from the first exemplary embodiment in that the fourth exemplary embodiment further includes steps of changing an imaging time interval based on a display temperature of a temperature distribution image when imaging controller 11 acquires the temperature distribution image by imaging a temperature measurement target and a step of issuing warning information (steps S145 to S147). Note that steps S141 to S144 and step S149 are identical to steps S101 to S104 and step S105 of the first exemplary embodiment, and therefore description thereof is omitted.

In step S145, imaging controller 11 determines whether or not a display temperature of a temperature distribution image exceeds a predetermined threshold value. For example, an average value of display temperatures of temperature measurement targets appearing in the temperature distribution image is calculated, and in a case where the average value exceeds a predetermined threshold value, it can be determined that the display temperature exceeds the predetermined threshold value. Alternatively, in a case where an average value of display temperatures of a temperature measurement target appearing in the temperature distribution image during a certain fixed time exceeds a threshold value, it can be determined that the change in display temperature exceeds the predetermined range. As the average value during the certain fixed time, for example, an average value of display temperatures of a specific portion of the temperature measurement target during a past one minute can be used. Instead of the average value, a maximum value, a median value, or a minimum value of the display temperatures of the temperature measurement target appearing in the temperature distribution image may be used. Alternatively, a display temperature of a specific portion of the temperature measurement target appearing in the temperature distribution image may be used. As the predetermined threshold value, a value input by a user can be used. Alternatively, the predetermined threshold value may be a preset value. The predetermined threshold value may be, for example, 140° C. When a display temperature of a temperature distribution image becomes high, thermographic camera 2 may enter a high temperature mode, and a temperature accuracy guarantee temperature may be changed. In view of this, in a case where the display temperature of the temperature distribution image becomes high and exceeds the threshold value, imaging controller 11 shortens an imaging time interval of N seconds (step S146). By thus increasing an imaging frequency in a case where the display temperature of the temperature distribution image exceeds the predetermined threshold value, it is possible to acquire more accurate temperature transition.

Furthermore, in a case where the display temperature of the temperature distribution image becomes high and exceeds the threshold value, imaging controller 11 issues warning information (step S147). The warning information can be issued, for example, by displaying the warning information on display 3. As the warning information, for example, a character or a symbol can be displayed on display 3. Alternatively, the warning information may be issued by sound or light. Alternatively, an alarm may be transmitted to an external device by a wireless communication module mounted on tablet 100.

Effects

According to the above exemplary embodiment, it is possible to perform imaging with improved reliability of a temperature distribution image. Furthermore, by changing the imaging time interval based on the display temperature of the temperature distribution image, a more accurate temperature distribution image can be acquired. Furthermore, by issuing warning information in a case where the display temperature of the temperature distribution image becomes high and exceeds the predetermined threshold value, it is possible to notify the user of occurrence of an abnormality.

Note that although the change of the imaging time interval and issuance of the warning information are executed in a case where the display temperature exceeds the predetermined threshold value in the above exemplary embodiment, both the change of the imaging time interval and the issuance of the warning information do not necessarily need to be executed, and only one of the change of the imaging time interval and the issuance of the warning information may be executed.

Fifth Exemplary Embodiment

A fifth exemplary embodiment will be described with reference to FIG. 14. In the fifth exemplary embodiment, the same or equivalent components as those in the first exemplary embodiment are denoted by the same reference numerals as those in the first exemplary embodiment. The description already given for the first exemplary embodiment is omitted for the fifth exemplary embodiment.

Figure 14:
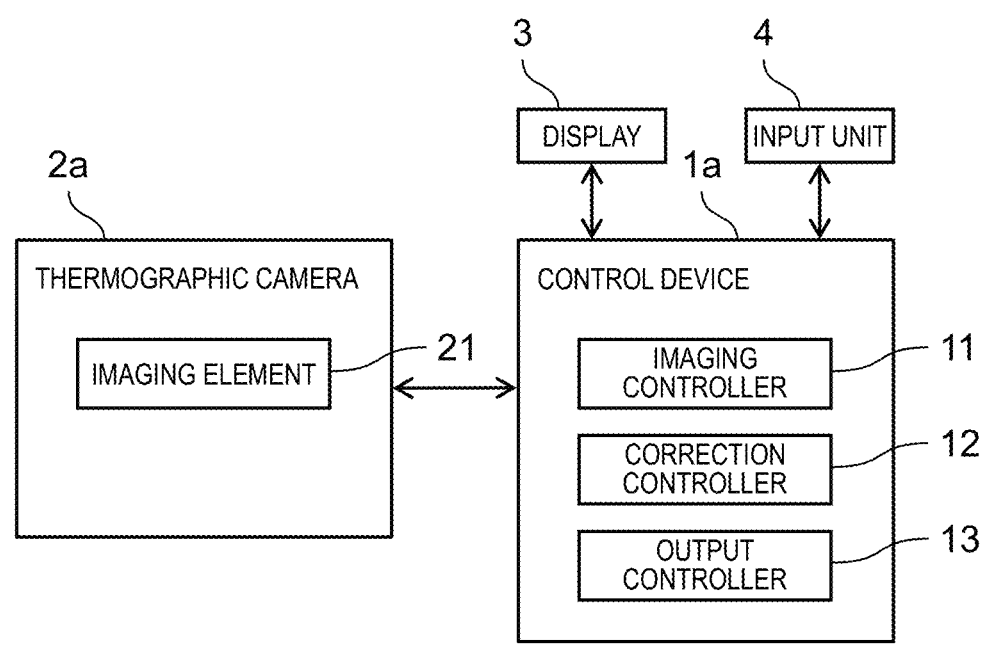
FIG. 14 is a block diagram illustrating a control device of a thermographic camera according to a fifth exemplary embodiment.

FIG. 14 is a block diagram illustrating control device 1a of thermographic camera 2a according to the fifth exemplary embodiment.

The fifth exemplary embodiment is different from the first exemplary embodiment in that control device 1a further includes output controller 13 as illustrated in FIG. 14. Output controller 13 controls output of information (first information) related to correction of a display temperature, which will be described later. Furthermore, the fifth exemplary embodiment is different from the first exemplary embodiment in that thermographic camera 2a does not include a shutter.

Furthermore, in the present exemplary embodiment, control device 1a controls a manual imaging mode in which imaging is performed at a timing set by a user by using thermographic camera 2a. Furthermore, correction controller 12 periodically corrects a display temperature of a temperature distribution image at predetermined correction time intervals. The predetermined correction time interval is determined in advance depending on characteristics of thermographic camera 2a or the like.

Output controller 13 generates and outputs information related to correction of the display temperature when acquiring input information from the user during execution of the correction. In the present exemplary embodiment, the first information is generated and output as the information related to correction of the display temperature. The first information is information indicating that correction is being executed. The first information can be, for example, displayed by a character, a symbol, or the like. Alternatively, the first information can be given by sound, light, or the like. In the present exemplary embodiment, display 3 is connected to control device 1a, and therefore the first information can be displayed on display 3 by using a character or a symbol.

Control device 1a is connected to input unit 4 such as a keyboard, a button, or a touch panel, and acquires input information from input unit 4. The input information can include, for example, information such as an imaging timing (immediate imaging or timer imaging) and the number of taken images. Imaging controller 11 causes thermographic camera 2a to image a temperature measurement target based on the input information and acquires a temperature distribution image. That is, in the present exemplary embodiment, imaging of a temperature measurement target and acquisition of a temperature distribution image are performed based on input information from a user unlike the interval imaging mode in which imaging is periodically performed.

Control device 1a and thermographic camera 2a may be mounted on a tablet (not illustrated) as in the first exemplary embodiment.

[Operation]

Figure 15:
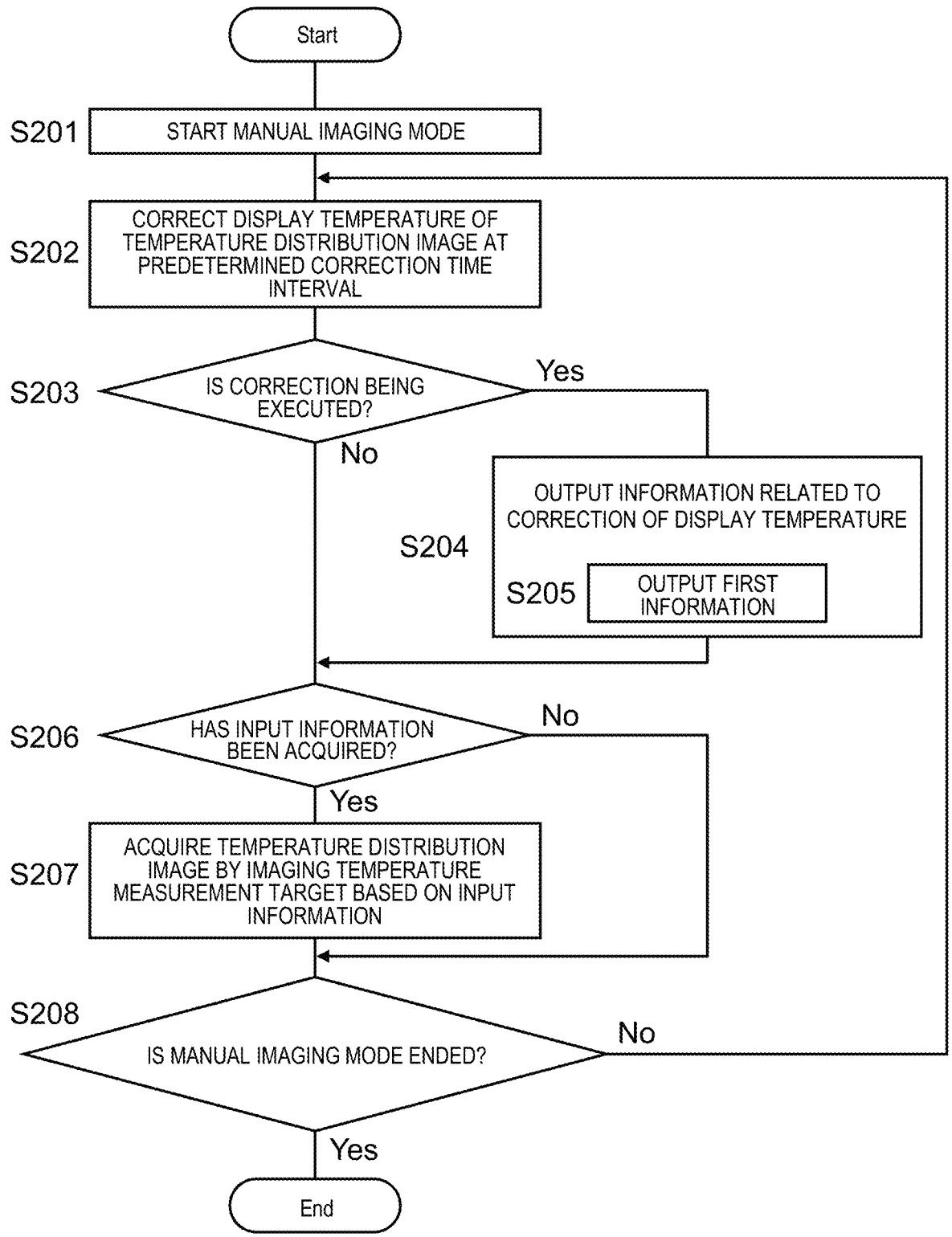
FIG. 15 is a flowchart illustrating a method for controlling the thermographic camera of FIG. 14.

A method for controlling thermographic camera 2a by control device 1a will be described with reference to FIG. 15. FIG. 15 is a flowchart illustrating a method for controlling thermographic camera 2a of FIG. 14.

First, the manual imaging mode is started by user's input (step S201). In this case, correction controller 12 periodically corrects a display temperature of a temperature distribution image at predetermined correction time intervals (step S202).

Imaging controller 11 determines whether or not correction of the display temperature is being executed by correction controller 12 (step S203). In a case where a predetermined standby time of k seconds has not elapsed from start of correction of the display temperature by correction controller 12, imaging controller 11 determines that correction is being executed (Yes in step S203). In a case where imaging controller 11 determines that correction is being executed, output controller 13 outputs information related to the correction of the display temperature (step S204). The step of outputting the information includes a step of outputting the first information indicating that correction is being executed (step S205). In the present exemplary embodiment, output controller 13 outputs the first information to display 3 by displaying a character string "temperature correction is being executed" as described with reference to FIG. 11. In a case where the predetermined standby time of k seconds has elapsed from start of correction of the display temperature by correction controller 12, imaging controller 11 determines that correction is not being executed (NO in step S203), and the processing proceeds to a next step.

The first information is not limited to a character string, and may be a symbol or the like. Alternatively, the first information may be an indicator indicative of how much longer it takes for the predetermined standby time to elapse from the start of the correction, that is, how much longer it takes for the correction to end.

Next, imaging controller 11 determines whether or not input information is acquired from the user (step S206). In a case where it is determined that input information has been acquired (Yes in step S206), imaging controller 11 causes imaging element 21 to image the temperature measurement target and acquire a temperature distribution image by controlling thermographic camera 2 (step S207). In a case where it is determined that input information has not been acquired (No in step S206), the processing proceeds to step S208.

Subsequently, imaging controller 11 determines whether or not to end the manual imaging mode (step S208). Imaging controller 11 determines that the manual imaging mode is ended, for example, in a case where the user inputs switching to another mode or in a case where the number of taken images has exceeded a predetermined number. In a case where imaging controller 11 determines that the manual imaging mode is not ended (No in step S208), the processing returns to step S202. In a case where imaging controller 11 determines that the manual imaging mode is ended (No in step S208), the processing ends.

Effects

According to the above exemplary embodiment, in the manual imaging mode, information related to correction of the display temperature is output. Specifically, in a case where correction is being executed, the first information indicating that correction is being executed is displayed on display 3. In a case where the first information is output to display 3, the user can easily recognize that correction is being executed, and imaging during execution of correction can be avoided. Therefore, it is possible to perform imaging with improved reliability of a temperature distribution image.

Note that although an example in which thermographic camera 2a does not include a shutter has been described in the above exemplary embodiment, thermographic camera 2a may include a shutter.

Furthermore, although an example in which the information related to correction of the display temperature is the first information indicating that correction is being executed has been described in the above exemplary embodiment, the information related to correction of the display temperature is not limited to the first information. For example, information indicating that correction is not being executed may be included.

Sixth Exemplary Embodiment

A sixth exemplary embodiment will be described with reference to FIGS. 16 and 17. In the sixth exemplary embodiment, the same or equivalent configurations as those in the fifth exemplary embodiment are denoted by the same reference numerals as those in the fifth exemplary embodiment. The description already given for the fifth exemplary embodiment is omitted for the sixth exemplary embodiment.

Figure 16:
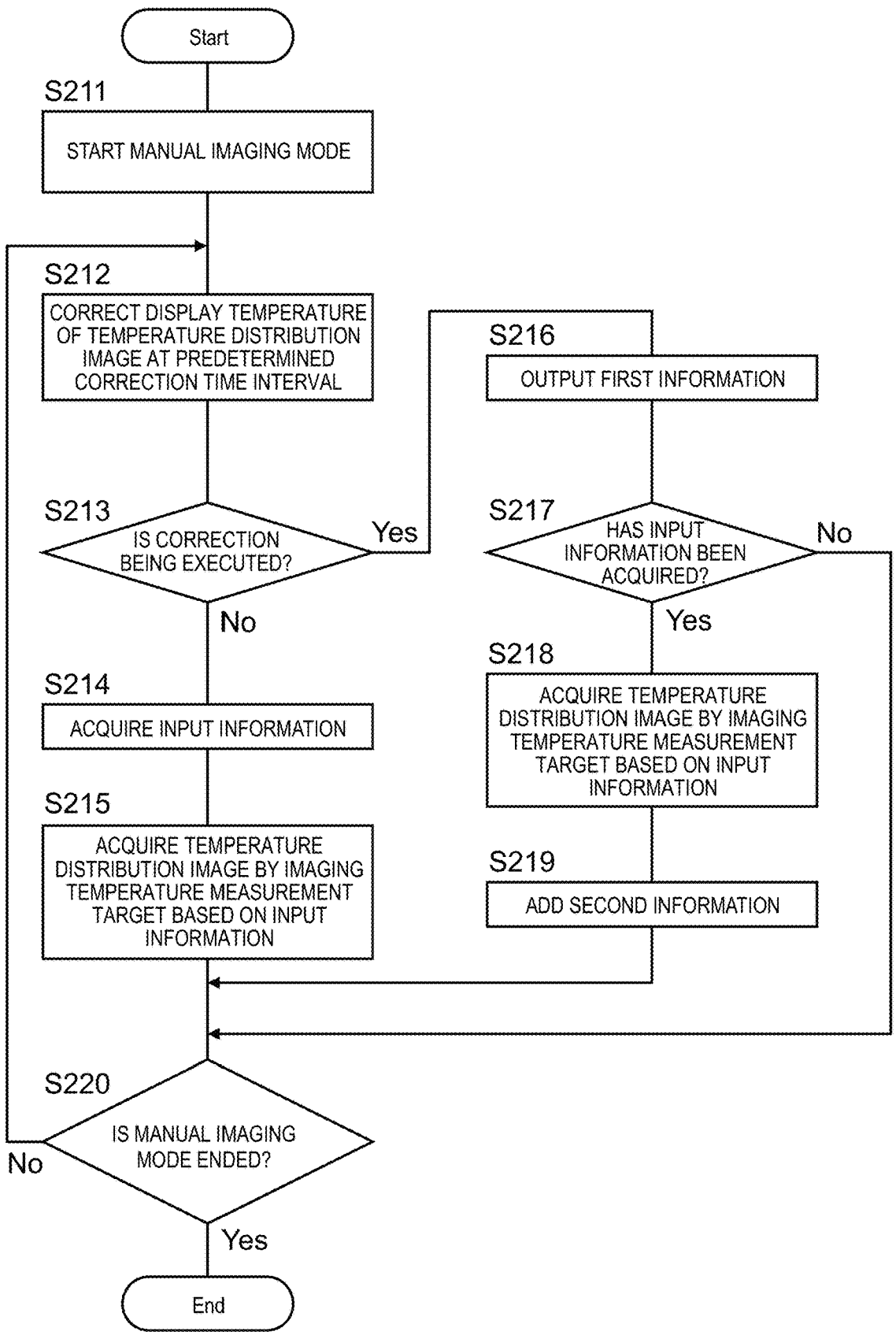
FIG. 16 is a flowchart illustrating a method for controlling a thermographic camera according to a sixth exemplary embodiment.

FIG. 16 is a flowchart illustrating a method for controlling thermographic camera 2a according to the sixth exemplary embodiment. FIG. 17 is a diagram illustrating an image taken by thermographic camera 2a.

As illustrated in FIG. 16, the sixth exemplary embodiment is different from the fifth exemplary embodiment in processing performed after imaging controller 11 determines that correction is being executed. In the present exemplary embodiment, second information is added to a temperature distribution image as information related to correction of a display temperature in addition to first information. The second information is information indicating that the temperature distribution image is an image acquired during execution of correction. Note that steps S211 to 213, steps S214 to S215, and step S220 are identical to steps S201 to S203, steps S206 to 207, and step S208 in FIG. 16, and therefore description thereof is omitted.

After output controller 13 outputs the first information (step S216), imaging controller 11 determines whether or not input information is acquired (step S217). In a case where it is determined that input information has been acquired (Yes in step S217), imaging controller 11 acquires a temperature distribution image by imaging a temperature measurement target (step S218). Next, output controller 13 adds the second information indicating that correction is being executed to the temperature distribution image acquired in step S218 (step S219).

Figure 17:
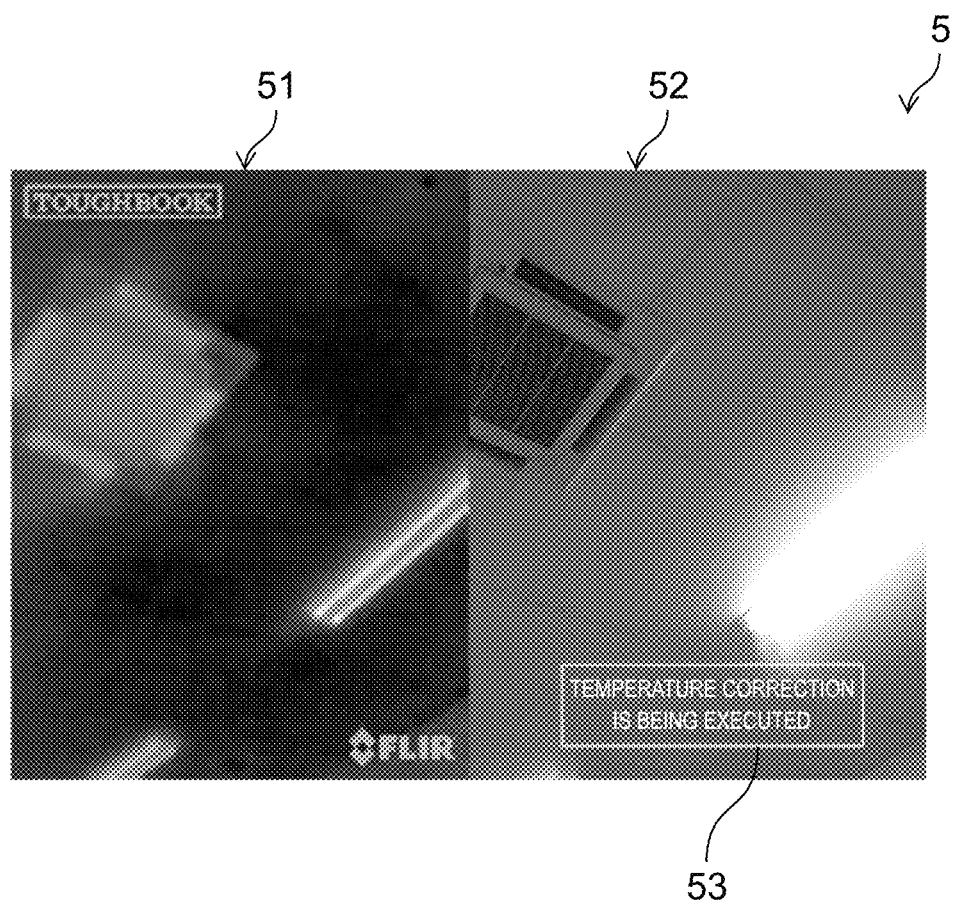
FIG. 17 is a diagram illustrating an image taken by the thermographic camera.

As illustrated in FIG. 17, the second information is displayed as character string 53 "temperature correction is being executed" in acquired image 5. The second information is not limited to a character string, and may be a symbol or the like. Note that, in image 5 illustrated in FIG. 17, temperature distribution image 51 acquired by thermographic camera 2a and image 52 acquired by a visible light camera are displayed side by side. A position at which the second information is displayed is not limited to the position illustrated in FIG. 17, and the second information can be displayed at any position. Furthermore, the second information may be added to a file name, metadata, or the like of the acquired image instead of being displayed on the image.

Effects

According to the above exemplary embodiment, in a case where a temperature distribution image is acquired by imaging during execution of correction, the second information indicating that the acquired temperature distribution image is an image taken during execution of correction is added to the acquired temperature distribution image. As a result, even during execution of correction, a temperature distribution image can be acquired by imaging. Furthermore, by adding the second information indicating that correction is being executed to a taken image, it is possible to easily identify that the acquired image is an image taken during execution of the correction.

Note that the step of outputting the first information in step S216 need not necessarily be executed.

Seventh Exemplary Embodiment

A seventh exemplary embodiment will be described with reference to FIGS. 18 and 19. In the sixth exemplary embodiment, the same or equivalent configurations as those in the sixth exemplary embodiment are denoted by the same reference numerals as those in the sixth exemplary embodiment. The description already given for the fifth exemplary embodiment is omitted for the sixth exemplary embodiment.

Figure 18:
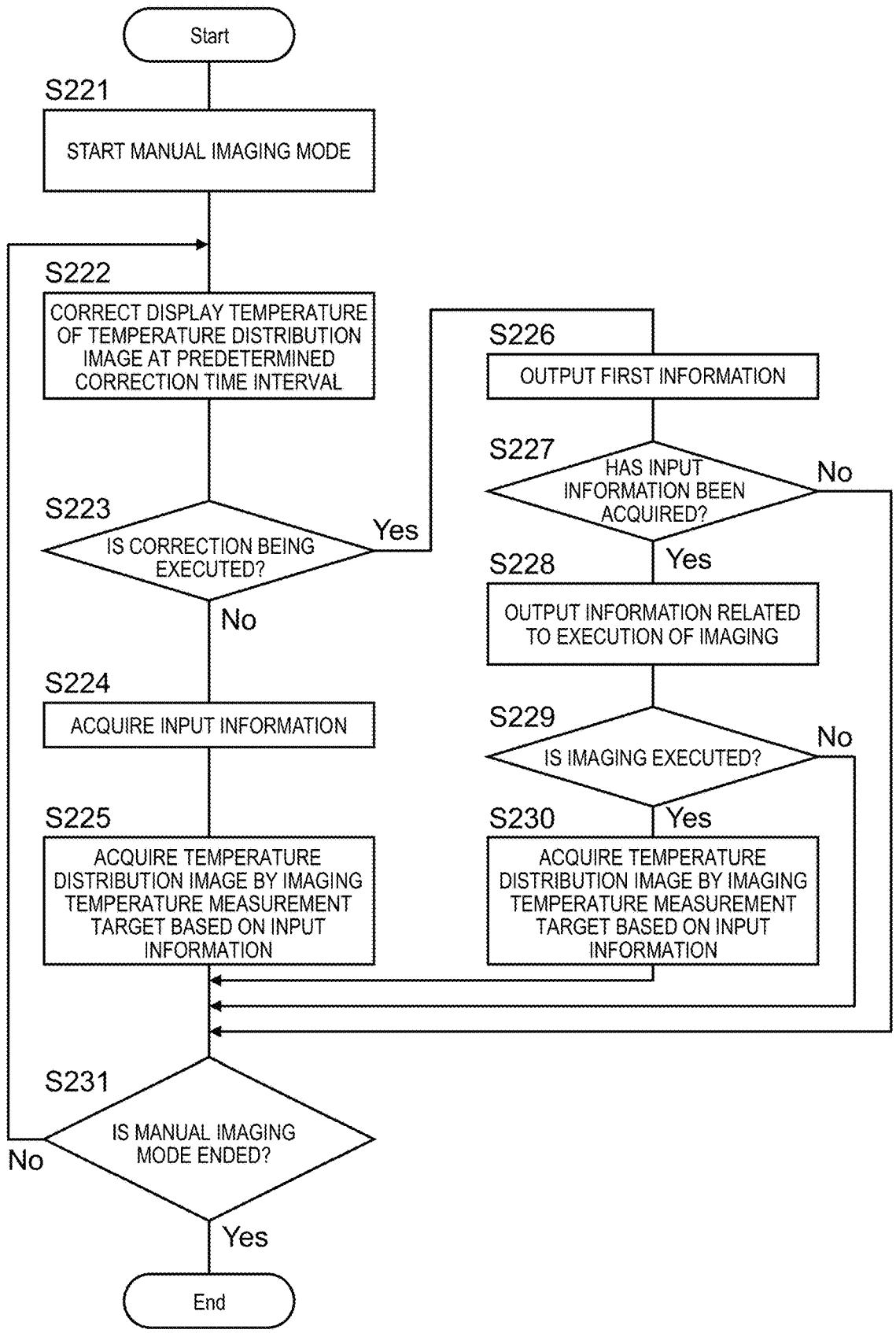
FIG. 18 is a flowchart illustrating a method for controlling a thermographic camera according to a seventh exemplary embodiment.
Figure 19:
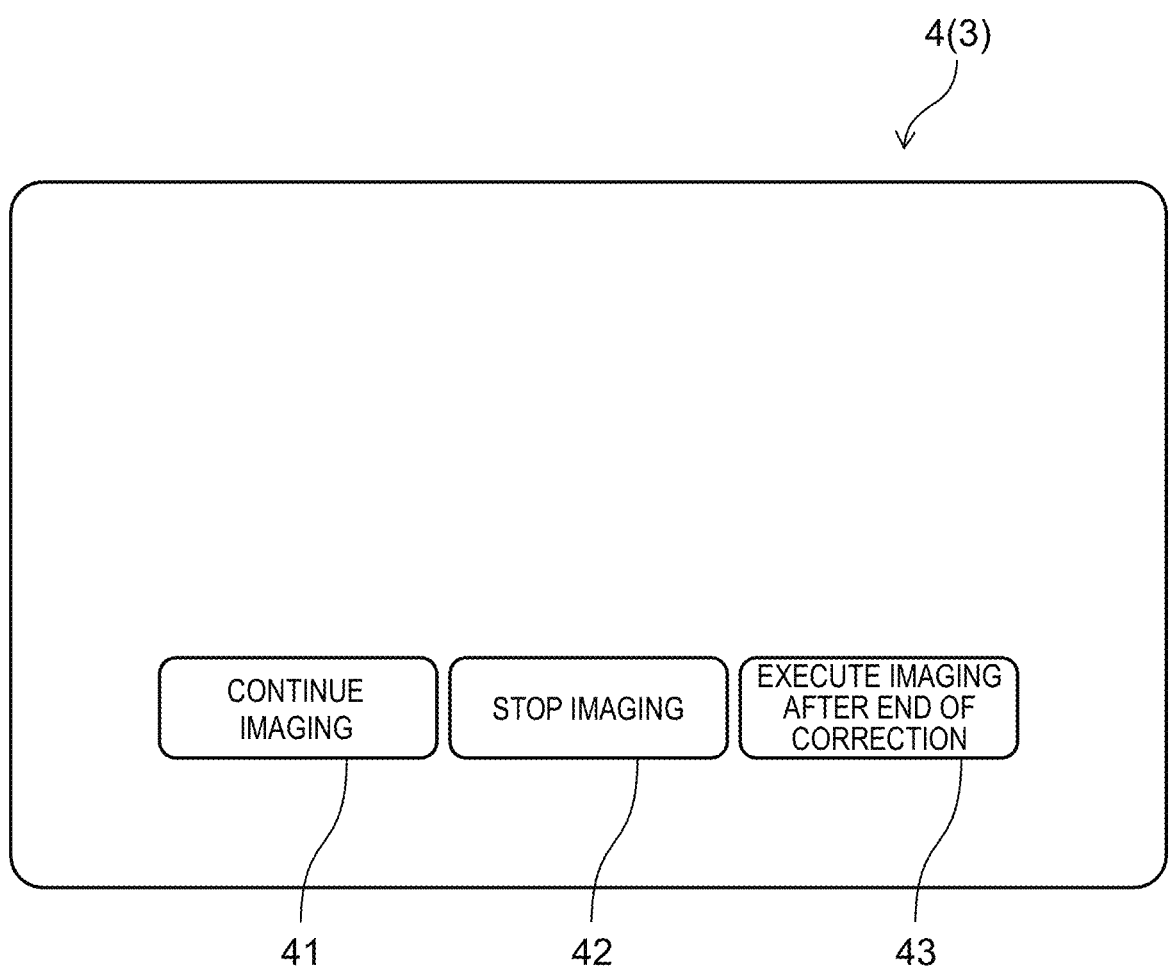
FIG. 19 is a diagram illustrating an example of information related to execution of imaging output to a display.

FIG. 18 is a flowchart illustrating a method for controlling thermographic camera 2a according to the seventh exemplary embodiment. FIG. 19 is a diagram illustrating an example of information related to execution of imaging output to display 3.

The seventh exemplary embodiment is different from the sixth exemplary embodiment in that when input information is acquired during execution of correction, output controller 13 outputs information related to execution of imaging (step S228). Furthermore, the seventh exemplary embodiment is different from the sixth exemplary embodiment in that execution of imaging is controlled based on imaging execution information input in response to the information related to execution of imaging (steps S229 and S230). Note that steps S221 to S227 and step S231 are identical to steps S211 to S217 and S220 of the sixth exemplary embodiment, and therefore description thereof is omitted.

In a case where it is determined that imaging controller 11 has acquired input information during execution of correction (Yes in step S227), output controller 13 outputs information related to execution of imaging. As illustrated in FIG. 19, the information related to execution of imaging can be output to display 3a. Imaging controller 11 acquires imaging execution information input in response to the output information related to execution of imaging, and executes imaging based on the acquired imaging execution information. For example, a user can select information related to execution of imaging by using buttons 41 to 43 on a touch panel (input unit 4). Imaging controller 11 performs control of continuing imaging when button 41 is selected, performs control of stopping imaging when button 42 is selected, or performs control of executing imaging after end of correction when button 43 is selected. The imaging execution information input in response to the output information related to execution of imaging may be input from a keyboard or the like instead of the touch panel.

When button 41 or button 43 is selected, imaging controller 11 determines that imaging is executed (Yes in step S229). In a case where button 42 is selected, imaging is executed after waiting until correction is ended in step S230. When button 42 is selected, imaging controller 11 determines that imaging is not executed (No in step S229).

Effects

According to the above exemplary embodiment, in a case where input information is received during execution of correction, information related to execution of imaging is output, and execution of imaging is controlled based on imaging execution information input in response to the information related to execution of imaging. As a result, even in a case where the imaging controller 11 acquires the input information from the user during the execution of the correction, it is possible to select interruption, continuation, continuation after the end of the correction, or the like of the imaging, and the convenience of the user is improved.

Eighth Exemplary Embodiment

An eighth exemplary embodiment will be described with reference to FIG. 20. In the eighth exemplary embodiment, the same or equivalent configurations as those in the fifth exemplary embodiment are denoted by the same reference numerals as those in the fifth exemplary embodiment. The description already given for the fifth exemplary embodiment is omitted for the eighth exemplary embodiment.

Figure 20:
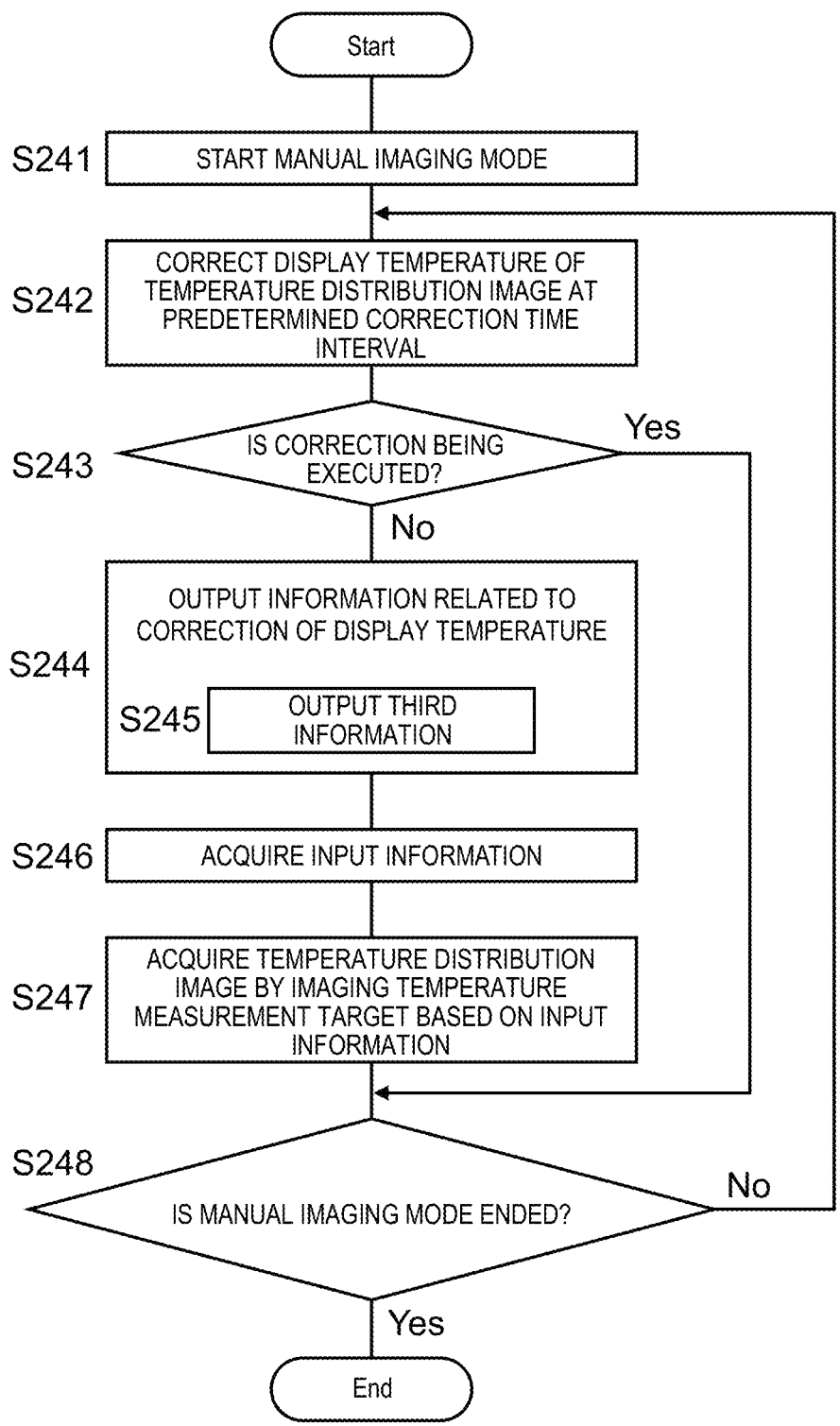
FIG. 20 is a flowchart illustrating a method for controlling a thermographic camera according to an eighth exemplary embodiment.

FIG. 20 is a flowchart illustrating a method for controlling thermographic camera 2a according to the eighth exemplary embodiment.

The eighth exemplary embodiment is different from the fifth exemplary embodiment in that third information indicating that correction is not being executed is output as information related to correction of a display temperature in a case where correction is not being executed (step S245). Note that steps S241 to S243 and steps S246 to S248 are identical to step S201 to S203 and steps SS246 to S248 of the fifth exemplary embodiment, and therefore description thereof is omitted.

In a case where imaging controller 11 determines that correction is not being executed (No in step SS243), output controller 13 outputs third information indicating that correction is not being executed (step S245). As the third information, for example, a character string, a symbol, or the like indicating that correction is not being executed can be displayed on display 3. Alternatively, the third information may be given by sound or the like. In a case where the third information is output, a user can input information after confirming that correction is not being executed. In a case where imaging controller 11 acquires the input information (step S246), imaging controller 11 executes imaging based on the input information (step S247).

Effects

According to the above exemplary embodiment, the third information indicating that correction is not being executed is output in a case where correction is not being executed. As a result, the user can easily recognize whether or not correction is being executed, and therefore convenience is improved.

Although an example in which the third information indicating that correction is not being executed is output as the information related to correction has been described in the above exemplary embodiment, the first information and/or the second information may be output in addition to the third information.

Ninth Exemplary Embodiment

A ninth exemplary embodiment will be described with reference to FIG. 21. In the ninth exemplary embodiment, the same or equivalent configurations as those in the fifth exemplary embodiment are denoted by the same reference numerals as those in the fifth exemplary embodiment. The description already given for the fifth exemplary embodiment is omitted for the ninth exemplary embodiment.

Figure 21:
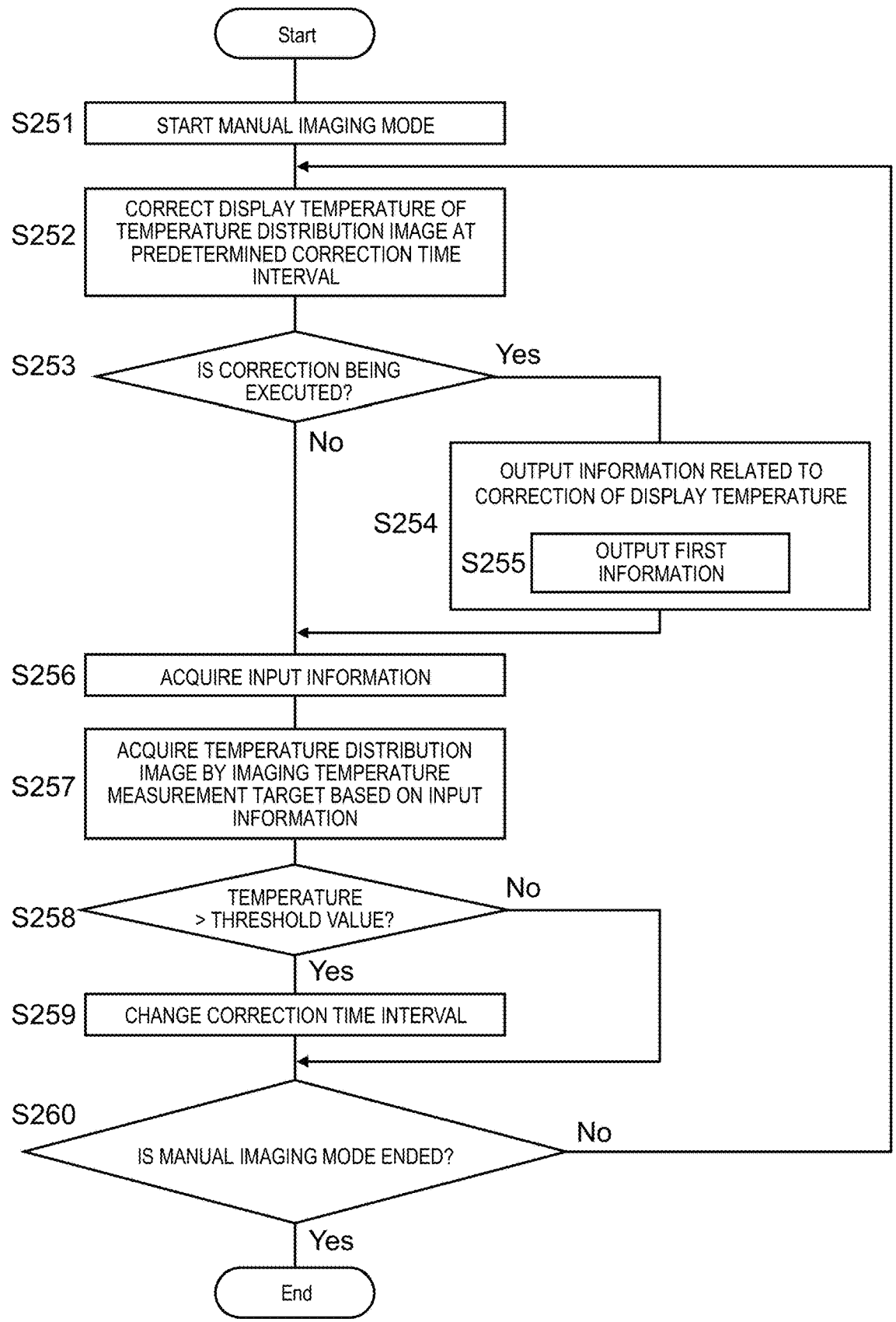
FIG. 21 is a flowchart illustrating a method for controlling a thermographic camera according to a ninth exemplary embodiment.

FIG. 21 is a flowchart illustrating a method for controlling thermographic camera 2a according to the ninth exemplary embodiment.

The ninth exemplary embodiment is different from the fifth exemplary embodiment in that a correction time interval is changed based on a display temperature of a temperature distribution image (steps S258 to S259). Note that steps S251 to S257 and step S260 are identical to steps S201 to S207 and step S208 of the fifth exemplary embodiment, and therefore description thereof is omitted.

In a case where a display temperature of a temperature distribution image acquired by imaging controller 11 exceeds a predetermined threshold value, there is a possibility that an abnormality has occurred in a temperature measurement target. Therefore, in a case where imaging controller 11 determines that the display temperature of the temperature distribution image exceeds the predetermined threshold value based on the display temperature (Yes in step S258), correction controller 12 changes a correction time interval (step S259). As the change of the correction time interval, for example, the correction time interval may be shortened to increase a frequency of correction. By increasing the frequency of correction, a more accurate temperature distribution image can be acquired.

In a case where it is determined that the display temperature of the temperature distribution image is equal to or lower than the threshold value (No in step S258), the correction time interval is not changed, and the processing proceeds to step S260.

Effects

According to the above exemplary embodiment, the correction time interval can be changed based on a change in display temperature of the temperature distribution image, and therefore a more accurate temperature distribution image can be acquired.

INDUSTRIAL APPLICABILITY

The present disclosure is widely applicable to a thermographic camera control method and a thermographic camera control device.

REFERENCE MARKS IN THE DRAWINGS 1, 1a: control device
2, 2a: thermographic camera
3: display
4: input unit
11: imaging controller
12: correction controller
13: output controller
21: imaging element
22: shutter

The invention claimed is:

1. A thermographic camera control method for controlling a thermographic camera, the thermographic camera control method comprising:
periodically correcting a display temperature of a temperature distribution image at a first interval; and
acquiring the temperature distribution image by periodically imaging a temperature measurement target at a second interval by the thermographic camera,
wherein the acquiring the temperature distribution image includes imaging the temperature measurement target after elapse of a standby time, the standby time being shorter than the second interval and starting from the correcting the display temperature, and
the standby time is decided based on a display temperature of a temperature distribution image of a reference object different from the temperature measurement target before the correcting the display temperature.

2. The thermographic camera control method according to claim 1, wherein
the thermographic camera includes an imaging element and a shutter disposed at a position closer to the temperature measurement target than the imaging element is, and
the correcting the display temperature includes:
closing the shutter;
acquiring a temperature distribution image of the shutter by imaging the shutter by the imaging element; and
correcting the display temperature based on the temperature distribution image of the shutter.

3. The thermographic camera control method according to claim 1, further comprising displaying the temperature distribution image and information indicating that correction is being executed on a display during the correcting the display temperature.

4. The thermographic camera control method according to claim 1, further comprising changing the standby time based on the display temperature of the temperature distribution image.

5. The thermographic camera control method according to claim 4, wherein the changing the standby time includes shortening the standby time when an amount of change of the display temperature of the temperature distribution image exceeds a predetermined range.

6. The thermographic camera control method according to claim 1, further comprising changing the second interval based on the display temperature of the temperature distribution image.

7. The thermographic camera control method according to claim 6, wherein the changing the second interval includes shortening the second interval when the display temperature of the temperature distribution image exceeds a predetermined threshold value.

8. The thermographic camera control method according to claim 7, further comprising issuing warning information when the display temperature of the temperature distribution image exceeds the predetermined threshold value.

9. The thermographic camera control method according to claim 1, wherein the standby time is from 10 seconds to 300 seconds inclusive.

10. A thermographic camera control device for controlling a thermographic camera including an imaging element that acquires a temperature distribution image by imaging a temperature measurement target, the thermographic camera control device comprising:
a correction controller that periodically corrects a display temperature of the temperature distribution image at a first interval; and
an imaging controller that causes the imaging element to image the temperature measurement target at a second interval,
wherein the imaging controller causes the imaging element to image the temperature measurement target after elapse of a standby time, the standby time being shorter than the second interval and starting from the correction of the display temperature by the correction controller, and
the standby time is decided based on a display temperature of a temperature distribution image of a reference object different from the temperature measurement target before the correcting the display temperature.

11. A thermographic camera control method for controlling a thermographic camera, the thermographic camera control method comprising:
   acquiring input information from a user;
   periodically correcting a display temperature of a temperature distribution image at a first interval;
   acquiring the temperature distribution image by imaging a temperature measurement target by the thermographic camera based on the input information; and
   outputting information related to correction of the display temperature,
   wherein the outputting the information includes displaying the temperature distribution image and first information indicating that correction is being executed on a display during the correcting the display temperature, and
   the first information includes an indicator indicating how much longer it takes for the correcting the display temperature to end.

12. The thermographic camera control method according to claim 11, wherein the outputting the information includes adding second information to the acquired temperature distribution image when the temperature distribution image is acquired during the correcting the display temperature, the second information indicating that the acquired temperature distribution image is an image taken during execution of the correction.

13. The thermographic camera control method according to claim 11, wherein
   the outputting the information includes outputting information related to execution of imaging when the input information is received during the correcting the display temperature, and
   the acquiring the temperature distribution image includes controlling execution of imaging of the temperature measurement target based on imaging execution information input in response to the information related to execution of imaging.

14. The thermographic camera control method according to claim 11, wherein the outputting the information includes outputting third information indicating that correction is not being executed while the display temperature is not being corrected.

15. The thermographic camera control method according to claim 11, further comprising changing the first interval based on the display temperature of the temperature distribution image.

16. The thermographic camera control method according to claim 15, wherein the changing the first interval includes shortening the first interval when the display temperature of the temperature distribution image exceeds a predetermined threshold value.

17. A thermographic camera control device for controlling a thermographic camera including an imaging element that acquires a temperature distribution image by imaging a temperature measurement target, the thermographic camera control device comprising:
   a correction controller that periodically corrects a display temperature of the temperature distribution image at a first interval;
   an imaging controller that acquires input information input to an input unit and causes the imaging element to image the temperature measurement target based on the input information; and
   an output controller that outputs information related to correction of the display temperature,
   wherein the outputting the information includes displaying the temperature distribution image and first information indicating that correction is being executed on a display during the correcting the display temperature, and
   the first information includes an indicator indicating how much longer it takes for the correcting the display temperature to end.

* * * * *